United States Patent
Kimes

(10) Patent No.: US 10,711,867 B1
(45) Date of Patent: Jul. 14, 2020

(54) TRANSMISSION ASSEMBLY AND METHOD OF USING SAME

(71) Applicant: Sigma Powertrain, Inc., Livonia, MI (US)

(72) Inventor: John W. Kimes, Wayne, MI (US)

(73) Assignee: Sigma Powertrain, Inc., Livonia, MI (US)

( * ) Notice: Subject to any disclaimer, the term of this patent is extended or adjusted under 35 U.S.C. 154(b) by 0 days.

(21) Appl. No.: 16/816,509

(22) Filed: Mar. 12, 2020

Related U.S. Application Data

(63) Continuation-in-part of application No. 16/253,144, filed on Jan. 21, 2019.

(60) Provisional application No. 62/817,549, filed on Mar. 12, 2019, provisional application No. 62/875,034, filed on Jul. 17, 2019, provisional application No. 62/982,419, filed on Feb. 27, 2020, provisional application No. 62/619,991, filed on Jan. 22, 2018.

(51) Int. Cl.
  *F16H 3/56* (2006.01)
  *F16H 1/28* (2006.01)

(52) U.S. Cl.
  CPC .................. *F16H 3/56* (2013.01); *F16H 1/28* (2013.01); *F16H 2001/2881* (2013.01); *F16H 2200/2007* (2013.01); *F16H 2200/2035* (2013.01); *F16H 2200/2046* (2013.01)

(58) Field of Classification Search
  CPC ..... F16H 3/46; F16H 3/52; F16H 3/56; F16H 2200/2007; F16H 2001/2881; F16H 2200/2038; F16H 2200/2041; F16H 2200/2087; F16H 2200/2089
  See application file for complete search history.

(56) References Cited

U.S. PATENT DOCUMENTS

| | | | |
|---|---|---|---|
| 7,572,201 B2 | 8/2009 | Supina | |
| 7,695,387 B2 | 4/2010 | Oba | |
| 8,241,166 B2 * | 8/2012 | Sung | B60K 6/40 475/280 |
| 8,888,637 B2 | 11/2014 | Kimes | |

(Continued)

FOREIGN PATENT DOCUMENTS

WO 2017049049 A1 3/2017

OTHER PUBLICATIONS

International Search Report, International Application No. PCT/US2019/14432, dated Apr. 9, 2019.

*Primary Examiner* — Jacob S. Scott
(74) *Attorney, Agent, or Firm* — Simonelli IP, PLLC

(57) ABSTRACT

A modular transmission assembly facilitates its use in all classes of trucks. The transmission is designed to receive one, two or three inputs. In addition, it can add torque multiplying gearsets when needed. The transmission assembly utilizes two gearsets configured in ring-carrier/ring-carrier configuration to operate as a four-node transmission. Two input shafts are coaxial with one inside the other (input shaft 1 inside input shaft 2) allowing torque from the second input to be received directly at the output shaft of the transmission. The transmission includes two controllable clutches coupling the second input with the two gearsets. Two controllable brakes selectively couple various gears of the gearsets to ground. Controlling the clutches and brakes controls the torque of the output shaft as a function of torques received by the first and second input shafts.

23 Claims, 33 Drawing Sheets

(56) References Cited

U.S. PATENT DOCUMENTS

| | | |
|---|---|---|
| 9,186,977 B2 | 11/2015 | Kimes |
| 9,933,049 B2 | 4/2018 | Kimes |
| 2012/0129646 A1* | 5/2012 | Kim ........................ F16H 3/66 |
| | | 475/210 |
| 2013/0296115 A1 | 11/2013 | Grutter |
| 2014/0350764 A1 | 11/2014 | Arai |
| 2016/0082821 A1 | 3/2016 | Mueller et al. |
| 2017/0151865 A1* | 6/2017 | Cho ....................... B60K 6/547 |
| 2017/0299053 A1* | 10/2017 | Kobayashi ............ F16H 61/702 |

* cited by examiner

| Modes | Clutches | | | |
|---|---|---|---|---|
| | B04 | B05 | K24 | K23 |
| A1B1 | | X | X | |
| A1B2 | X | X | | |
| A2B2 | X | | | X |
| A3B2 | | | X | X |
| Rev | X | X | X | |
| Park | X | X | | |
| Hill Hold | 1/2 | X | | |

| Mode | State | K23 | K24 | K35 | K36 | B06 | B07 | B04 |
|---|---|---|---|---|---|---|---|---|
| EV Mode | A1B1 | X | | | X | | X | |
| | A1B2 | X | | X | | | X | |
| | A2B2 | X | | X | X | X | | |
| | A3B2 | X | | X | X | | | |
| | Rev | X | | | | | X | |
| Hybrid Mode - power split | ECVT1 | | X | | | | X | |
| | ECVT2 | | X | X | X | X | | |
| | ECVT3 | | X | X | | | | |
| | TRANSITION | X | | X | X | | | |
| Gas | OD | | | X | X | | | |
| Park | Off | | | | | X | X | |
| Generator | Off | | X | | | X | X | X |

FIG. 31

| | State | K23 | K34 | K36 | K45 | B04 | B06 | B07 |
|---|---|---|---|---|---|---|---|---|
| EV Mode | A1B1 | | X | X | | | | X |
| | A1B2 | X | X | | | | X | X |
| | A2B2 | X | X | | | | | |
| | A3B2 | X | X | X | | | | |
| Hybrid Mode - power split | ECVT1 | ☐ | | | X | | | X |
| | ECVT2 | ☐ | | X | X | | X | |
| | ECVT3 | X | X | | X | | | |
| | TRANSITION | X | X | | | | | |
| ICE | 1:1 | X | X | X | X | | | |
| ICE | OD | X | | X | X | X | | |
| Park | Off | | | | | | X | X |
| Hill Hold* | A1B1 | | | | X | | 1/2 | X |
| Generator | Off | | | | | | X | X |

☐ = OPTIONAL
\* = Solenoid clutch

FIG. 37

TRANSMISSION ASSEMBLY AND METHOD OF USING SAME

This patent application is a continuation-in-part of U.S. patent application Ser. No. 16/253,144, which claims priority from U.S. provisional patent application 62/619,991, filed on Jan. 22, 2018, which are hereby incorporated by reference. Furthermore, this patent application claims priority from U.S. provisional patent applications 62/817,549, 62/875,034, and 62/982,419, which are hereby incorporated by reference.

BACKGROUND ART

1. Field of the Invention

The invention relates to transmission assemblies used to control torque received from a power source and to provide an output torque to driven wheels of a vehicle. More particularly, the invention relates to transmission assemblies used to control torque received from a power source and to provide an output torque to driven wheels of a vehicle without the use of friction, hydraulics, or pneumatics.

2. Description of the Related Art

All electric, hybrid electric, and plug-in hybrid electric vehicles (collectively referred to as EVs) have a powertrain to transfer power from various power generators to the driven wheels of the vehicle. Traditional transmissions utilize hydraulics and friction to operate. These two performance principles work well in the traditional transmission when powered by an internal combustion engine. The physics of these traditional transmission result in extreme amounts of energy waste, preventing their incorporation into EVs due to the limitations on range these losses create.

SUMMARY OF THE INVENTION

A transmission assembly includes a transmission housing. A first gearset, including first, second and third rotating elements, is disposed within the transmission housing. A second gearset, including fourth, fifth and sixth rotating elements, is disposed within the transmission housing adjacent the first gearset. An output shaft is connected to the third rotating element of the first gearset and the fifth rotating element of the second gearset. An input shaft is connected to the fourth rotating element of the second gearset. A controllable clutch is connected between the input shaft at a first end and the output shaft at a second end. A first controllable brake selectively couples the first rotating element to the transmission housing. A second controllable brake selectively couples the second rotating element of the first gearset and the sixth rotating element of the second gearset to the transmission housing, such that controlling the first and second controllable clutches and the first and second controllable brakes controls the torque of the output shaft as a function of torques received by the first and second input shafts.

BRIEF DESCRIPTION OF THE DRAWINGS

Advantages of the invention will be readily appreciated as the same becomes better understood by reference to the following detailed description when considered in connection with the accompanying drawings, wherein:

FIG. 31 is a table showing which clutches of the third alternative embodiment of the transmission shown in FIG. 33 are on based on the state of the inputs;

FIG. 37 is a table showing which clutches of the alternative embodiment of the transmission shown in FIG. 30 are on based on the state of the inputs.

DETAILED DESCRIPTION OF THE DRAWINGS

Figure 1A:
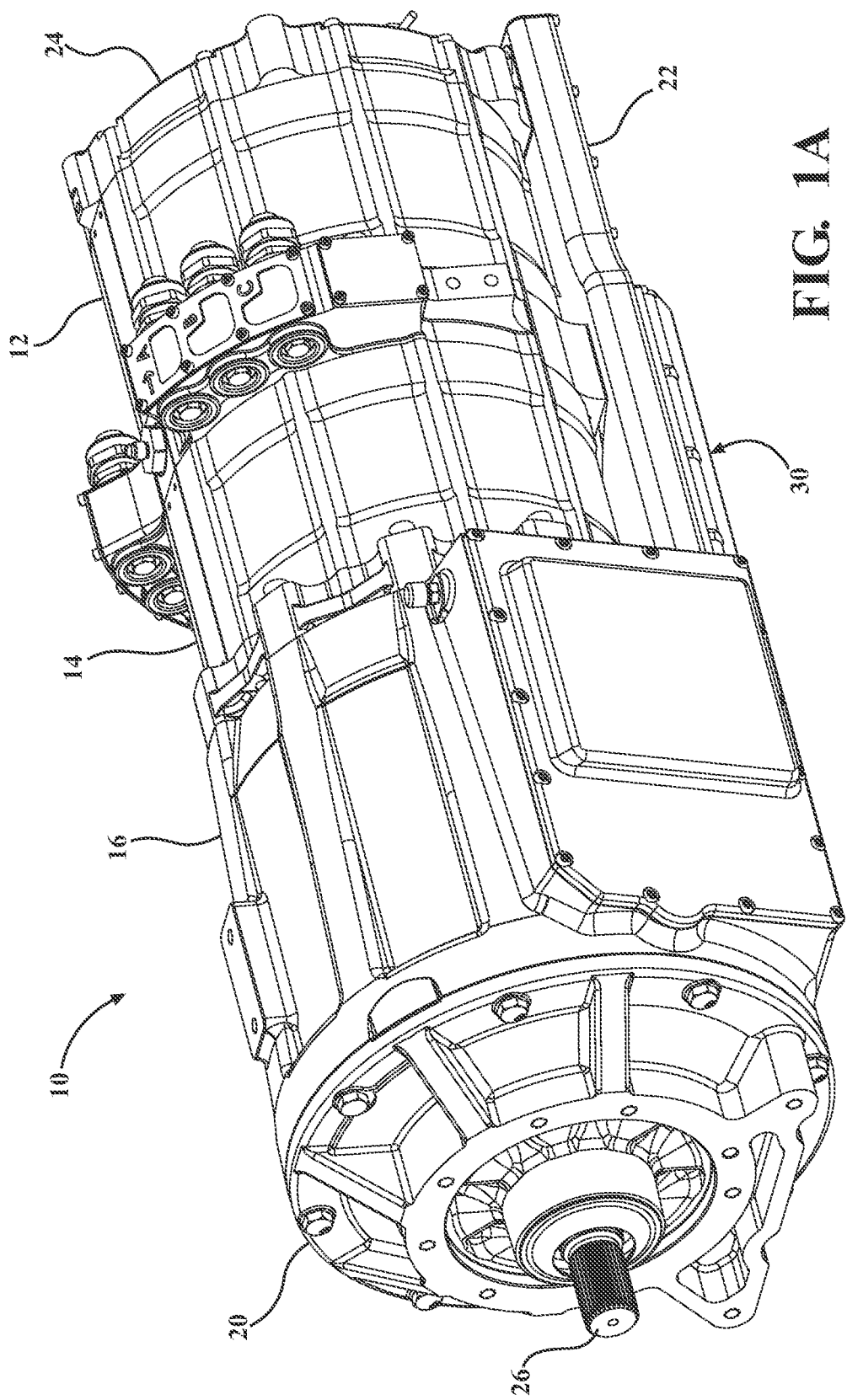
FIG. 1A is a perspective view of one embodiment of a vehicular powertrain.

For purposes of this discussion, elements will be identified by reference characters, typically reference numerals. There are several embodiments shown in the Figures that will be described in detail below. For purposes of simplicity, these elements will retain their reference characters throughout the discussion. If an element has characteristics that are different from one embodiment to another, those differences will be discussed when introducing the same element for the new embodiment.

Referring to FIG. 1A, a perspective view of one embodiment of a transmission is generally shown at 10. In this Figure, the transmission 10 is operatively connected to a first motor 12 and a second motor 14. Physically, the second motor 14 is mounted to the transmission 10 between the transmission 10 and the first motor 12. The first motor 12 has an output (discussed subsequently) that extends through the second motor 14 and to the transmission 10.

Figure 1B:
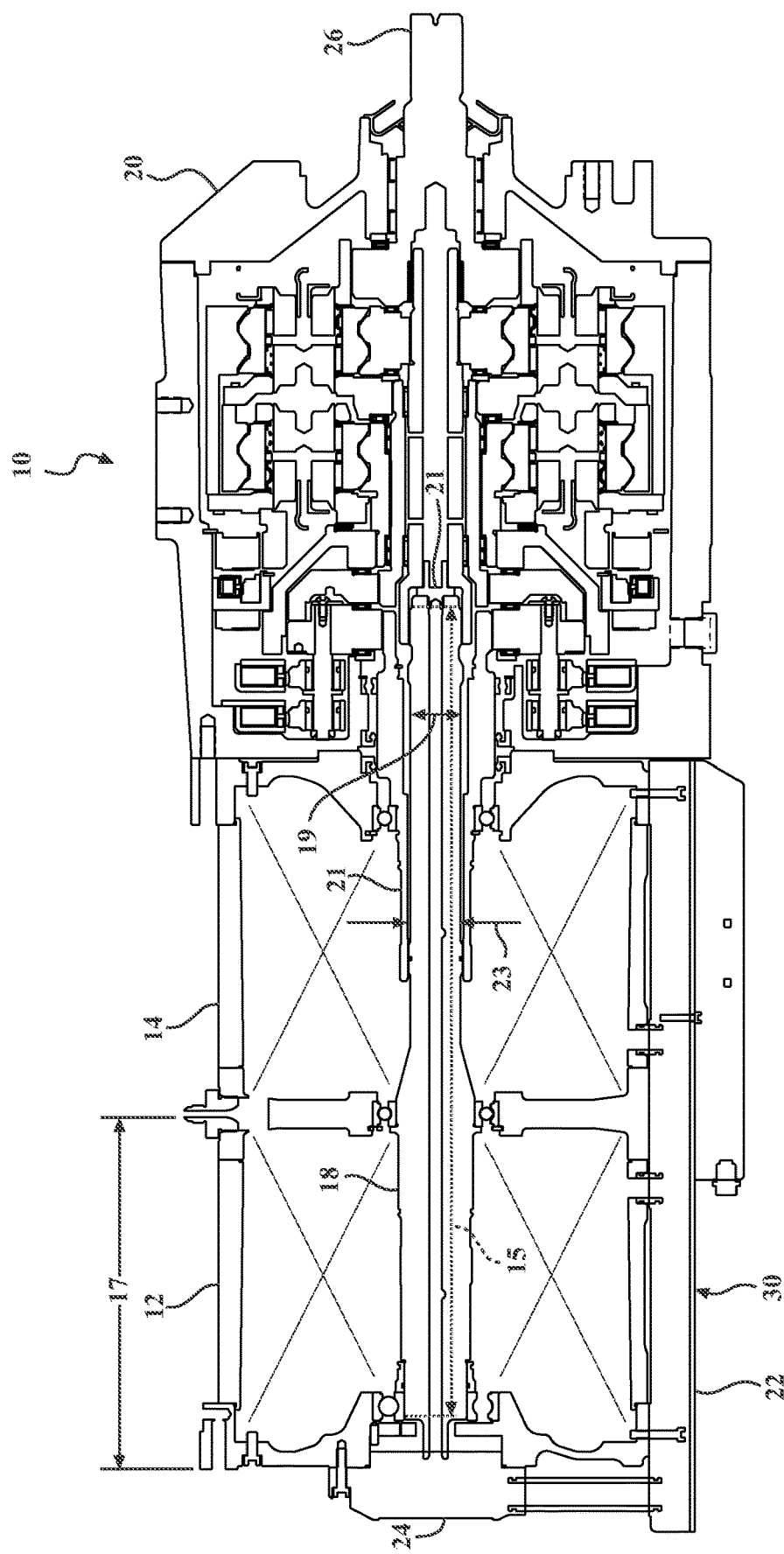
FIG. 1B is a schematic drawing of a cross-section of the embodiment shown in FIG. 1A.

The transmission 10 includes a transmission housing 16 having a housing cap 20. FIGS. 1A and 1B show the second motor 14 (B-Motor) secured to the transmission housing 16 and the first motor 12 (A-Motor) secured to the second motor 14 (B-Motor). A first motor output shaft 18 of the first motor 12 (A-Motor) defines a length 15 that is longer than a length 17 of the first motor 12. The first motor output shaft 18 also defines an outer diameter 19 at its distal end 21.

The second motor 14 (B-Motor) includes a second motor output shaft 21. The second motor output shaft 21 defines an inner diameter 23 that is larger than the outer diameter 19 of the first motor output shaft 18. The first motor output shaft 18 extends through and is coaxial with the second motor output shaft 21. It should be appreciated by those skilled in the art that the first motor output shaft 18 may not extend all the way through the second motor output shaft 21.

In alternative embodiments that will be discussed in greater detail below, the first 12 and second 14 motors may be mounted on either side of the transmission 10. Oil used to cool the transmission 10, the first motor 12 and the second motor 14 is collected by a catch basin 22 and recirculated using a sump 24. Because the catch basin 22 extends along the entire length of the transmission 10, the first motor 12 and the second motor 14, only one sump 24 is necessary. The transmission 10 has an output shaft 26 that extends out through the center of the housing cap 20. Electrical ports 28 provide electrical access (power and communications) inside the first 12 and second 14 motors. The transmission 10, first motor 12, second motor 14, and sump 24 may be referred to as a powertrain, generally shown at 30.

Figure 2:
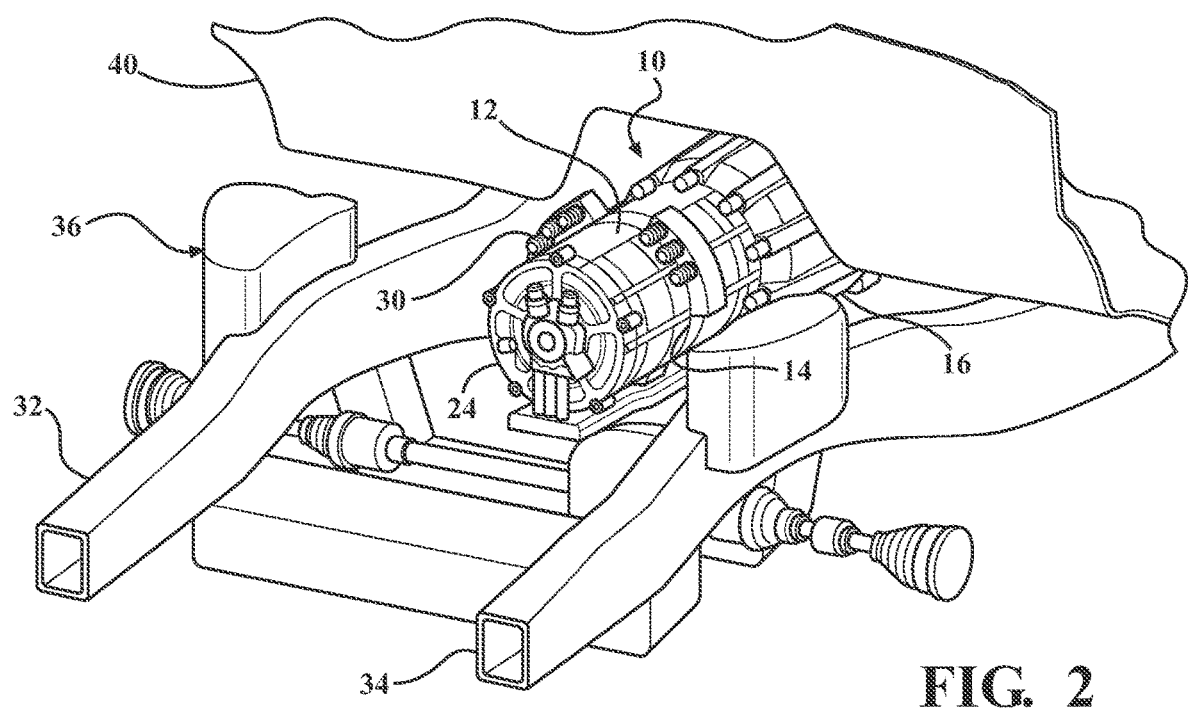
FIG. 2 is a perspective view of the powertrain embodiment shown in FIG. 1 mounted to a vehicle.
Figure 3:
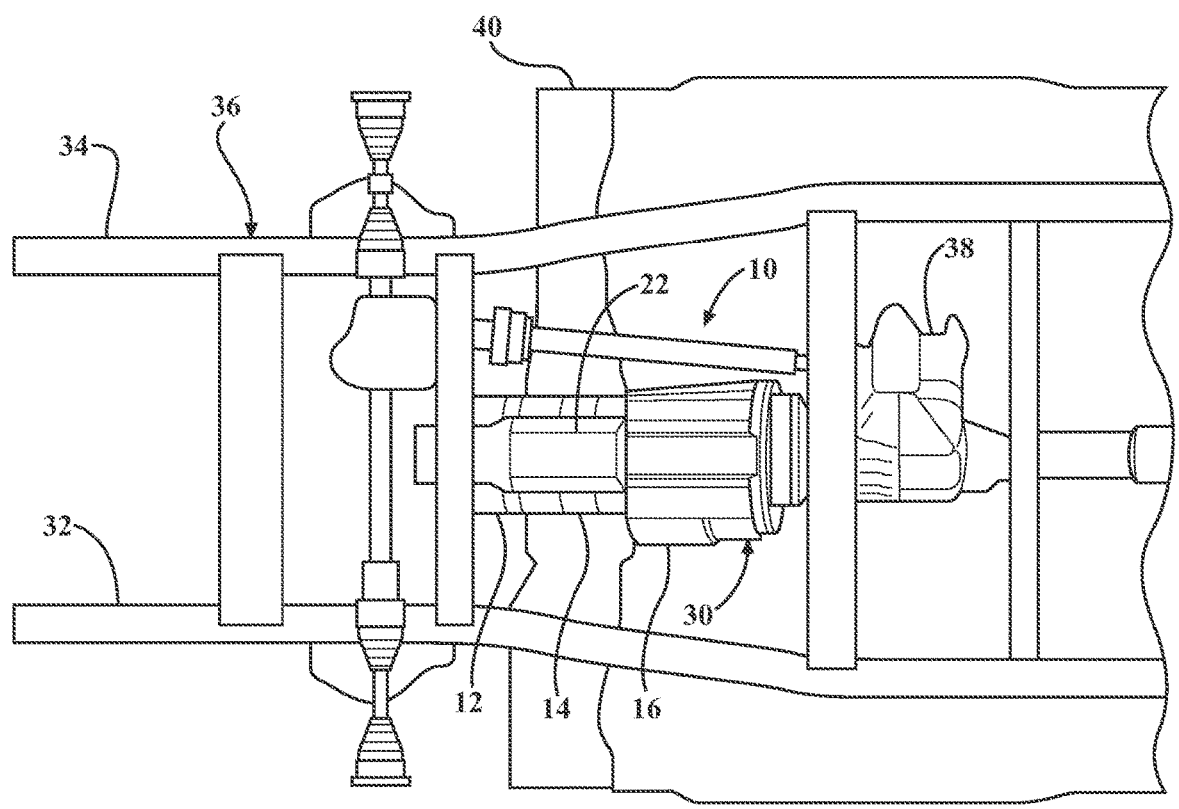
FIG. 3 is a bottom view of a vehicle with the powertrain embodiment shown in FIG. 1 mounted thereto.

Referring to FIGS. 2 and 3, the powertrain 30 is shown mounted between two rails 32, 34 of a vehicular frame, generally shown at 36. A body 40, including a passenger compartment (not shown), is shown fixedly secured to the vehicular frame 36. Referring specifically to FIG. 3, the transmission 10 is shown connected to a drive line 38 that drives four wheels (none shown).

One Input Configuration

Figure 4:
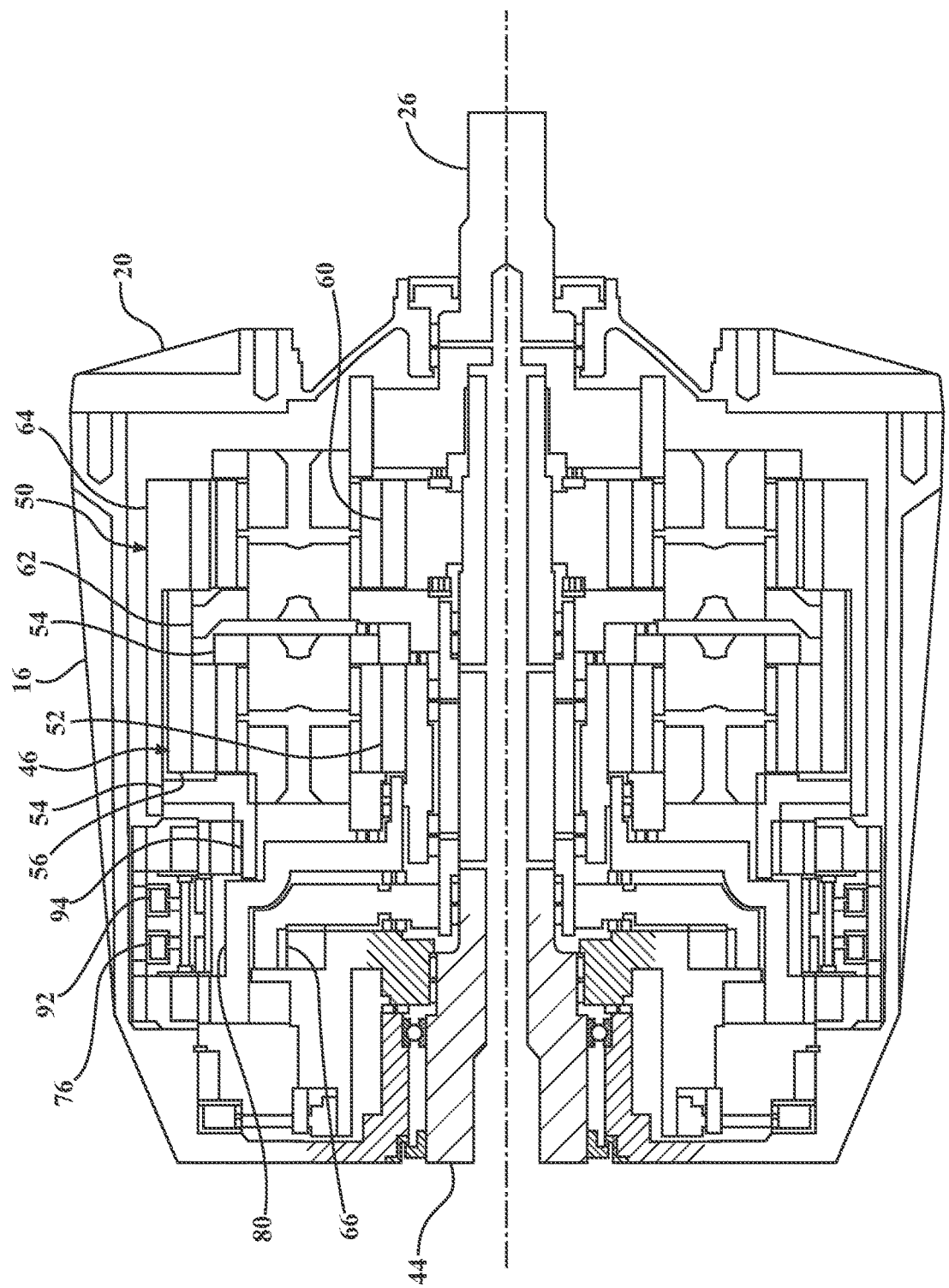
FIG. 4 is a cross-sectional side view of a transmission having one input.
Figure 5:
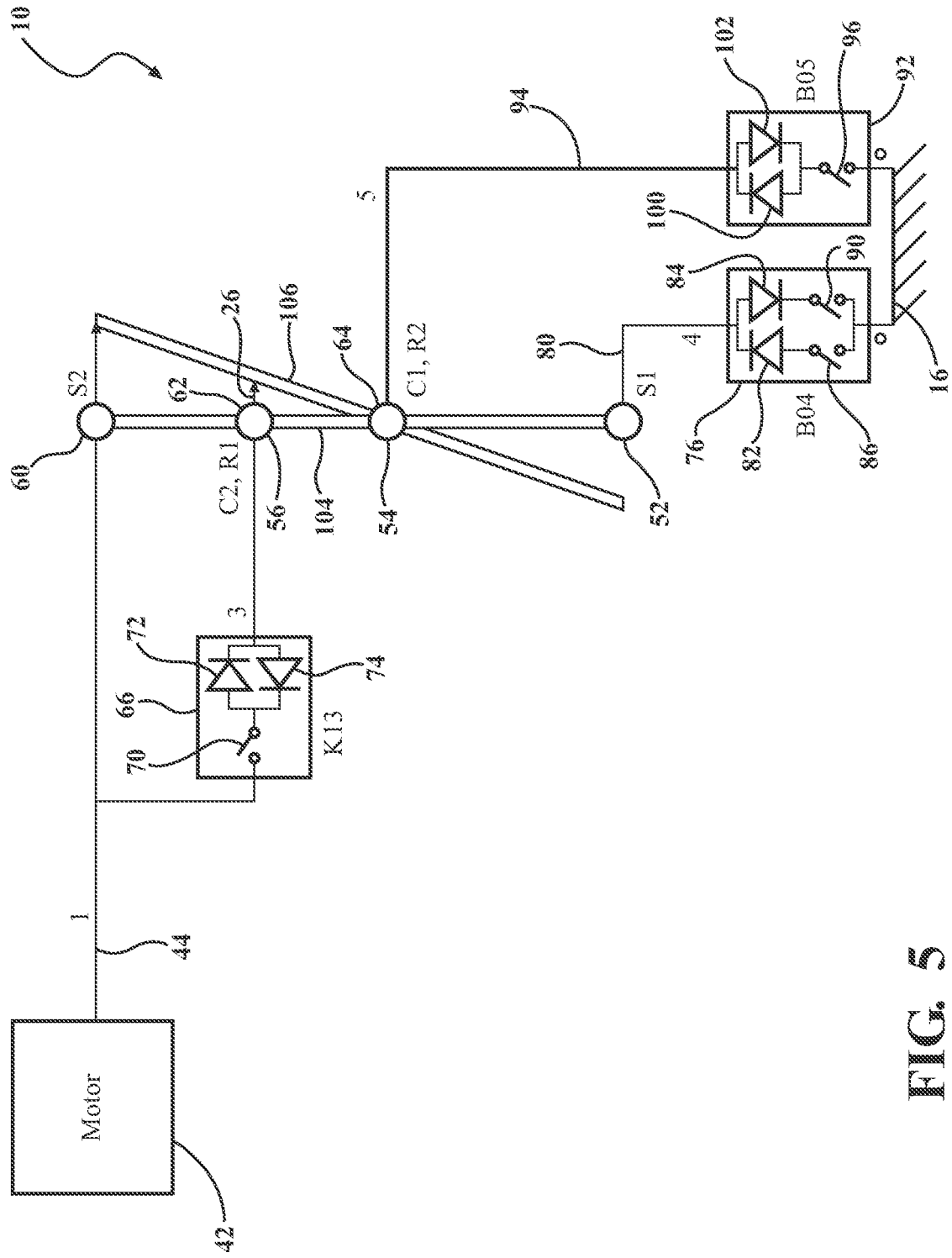
FIG. 5 is a lever diagram for the transmission shown in FIG. 4.
Figure 6:
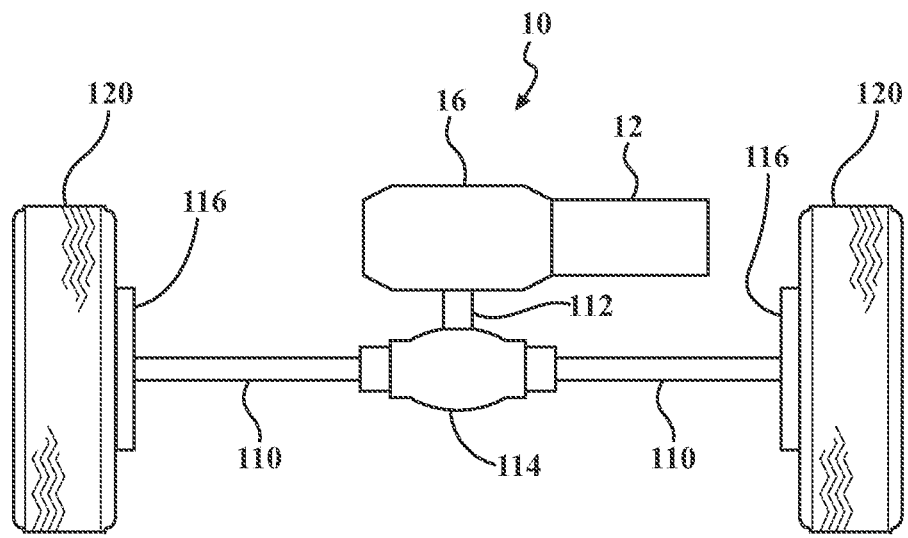
FIG. 6 is a schematic view of the transmission of FIG. 4 operatively secured to a differential of a driven axle.

Referring to FIGS. 4 through 6, the transmission 10 is shown in a configuration for operating with a single input. In this configuration, the single input is the first motor 12 fixedly secured directly to the transmission housing 16 in the absence of the second motor 14. The first motor 12 is not shown in FIG. 4, but the first motor output shaft 18 would be received by the input shaft 44.

The input shaft 44 is also designated as shaft "1" in the power flow shown in FIG. 5. The transmission 10 also includes a first gearset, generally shown at 46, and a second gearset, generally shown at 50. The first gearset 46 includes first 52, second 54 and third 56 rotating members. The second gearset 50 includes a fourth 60, fifth 62, and sixth 64 rotating members. These gearsets 46, 50 may be any gearset that has three rotating members. Types of gearsets contemplated include, but are not limited to, Ravigneaux gearsets, Simpson gearsets and ring-carrier/ring-carrier gearsets. The gearsets 46, 50 shown in FIGS. 4 and 5 are ring-carrier/ring-carrier gearsets. Because these gearsets are ring-carrier/ring-carrier gearsets, the first, second and third rotating members are a sun gear, a carrier and a ring gear, respectively. These are indicated as S1, C1, and R1 for the first gearset 46 and S2, C2, and R2 for the second gearset 50. Two rotating members from the first gearset 46 and two rotating members from the second gearset 50 are fixedly secured to each other. These connections create a four-node linkage for the transmission 10. As such, each pair of rotating members is represented by a single circle in FIG. 5. Therefore, the third first rotating member 56 (ring gear R1) and the fifth rotating member 62 (carrier C2) are fixedly secured to each other and represented by both reference numerals 56 and 62 in FIG. 5, whereas the second rotating member 54 (carrier C1) and the sixth rotating member 64 (ring gear R2) are fixedly secured to each other and represented by both reference numerals 54 and 64 in FIG. 5.

The output shaft 26 of the transmission 10 is also fixedly secured to two rotating members, one from each gearset 46, 50. In the embodiment shown in FIGS. 4 and 5, the output shaft 26 is fixedly secured to the third rotating member 56 (the ring gear R1 of the first gearset 46 and the fifth rotating member 62 of the second gearset 50 (the carrier C2 of the second gearset 50). The motor 12 is connected directly to the fourth rotating member 60 of the second gearset 50 using the input shaft 44 (shaft 1).

A controllable clutch 66 is connected between the input shaft 44 (shaft 1) at one end and the output shaft 26 (shaft 3) at the other end. The controllable clutch 66 is also represented by the nomenclature K13 because it couples shafts 1 and 3 together. Referring specifically to FIG. 5, the controllable clutch 66 is represented by a switch 70 and two diodes 72, 74. These three elements 70, 72, 74 represent the attributes of the controllable clutch 66. More specifically, the switch 70 signifies that the controllable clutch 66 may be turned on and off. The diodes 72, 74 represent the fact that the controllable clutch 66 may either bidirectionally lock the third rotating member 56 (ring gear R1), the fifth rotating member 62 (second carrier C2) and the output shaft 26 (shaft 3), or allow those elements 56, 62, 26 to rotate freely in both directions. Therefore, when the switch 70 is closed, representing the active state for the controllable clutch 66, the output shaft 26 rotates with the rotation of the input shaft 44. When the switch 70 is open, representing an inactive state for the controllable clutch 66, the output shaft 26 does not rotate or, alternatively, rotates based on the torques it receives from the other rotating elements 52, 54, 60, 64 of the first 46 and second 50 gearsets.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects shaft 0 (which is just the transmission housing 16) with a fourth shaft 80 (shaft 4). The first controllable brake 76 (B04) is similar to the controllable clutch 66 in that it is represented by two diodes 82, 84 representing that it will lock and allow rotation in either direction. The first controllable brake 76 (B04) is different from the controllable clutch 66 in that each direction of operation can be controlled independently of the other, as represented by switches 86, 90. Operation of the first controllable brake 76 will be discussed in greater detail subsequently.

This transmission 10 also includes a second controllable brake 92 which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only has the ability to control whether a notch plate 94 (shaft 5) is rotating or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock or allow the notch plate 94 (shaft 5) rotate in either direction.

FIG. 5 also includes two levers 104, 106. These levers 104, 106 are graphic representations of how torques received by the transmission 10 affect the torque provided at the output shaft 26 (shaft 3). The first lever 104 represents when no speed is applied to the output shaft 26 (shaft 3) and/or when the transmission 10 is at rest. The second lever 106 represents a transmission 10 in a state of operation that will be discussed in greater detail subsequently.

Referring to FIG. 6, the transmission 10 is shown with the motor 12 secured transverse to a driven axle 110. The torque at the output shaft 26 (not shown in FIG. 6) is redirected using a gearset 112 that connects the output shaft 26 to an axle differential 114. As is well known in the art, the axle 110 drives wheels 116 and tires 120.

Two Input Configuration

Figure 7:
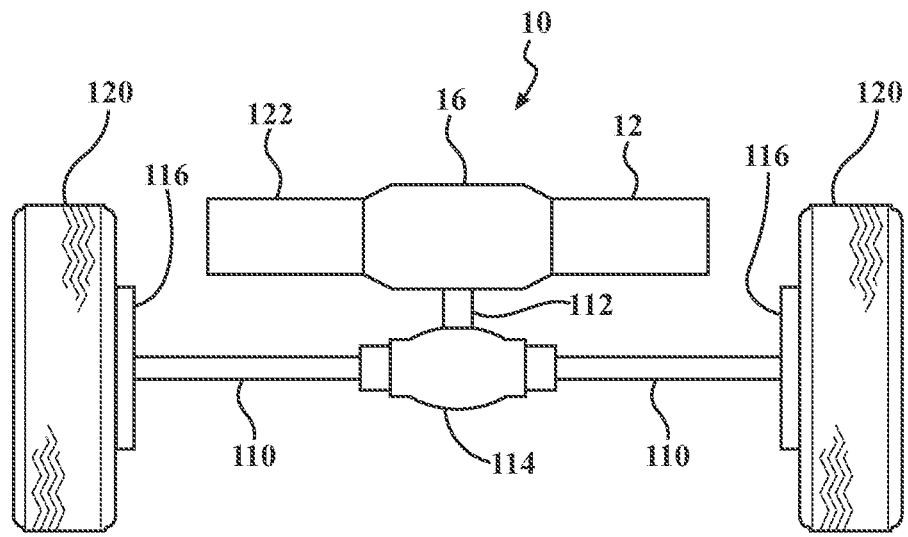
FIG. 7 is a schematic view of a transmission having two inputs wherein the transmission is operatively secured to a differential of a driven axle.

Referring to FIG. 7, a second embodiment of the transmission 10 is shown attached transversely to an axle differential 114 via the gearset 112 in a manner similar to that which was shown in the first embodiment in FIG. 6. The difference between this transmission 10 in the transmission of the prior Figure is that this transmission 10 receives two inputs, one from the first motor 12 (A-Motor) and one from a second motor 14 (B-Motor). It may be appreciated by those skilled in the art that the transmission 10 with inputs from a first motor 12 (A-Motor) and a second motor 14 (B-Motor) will provide a wider range of torque at the output shaft 26.

Figure 8:
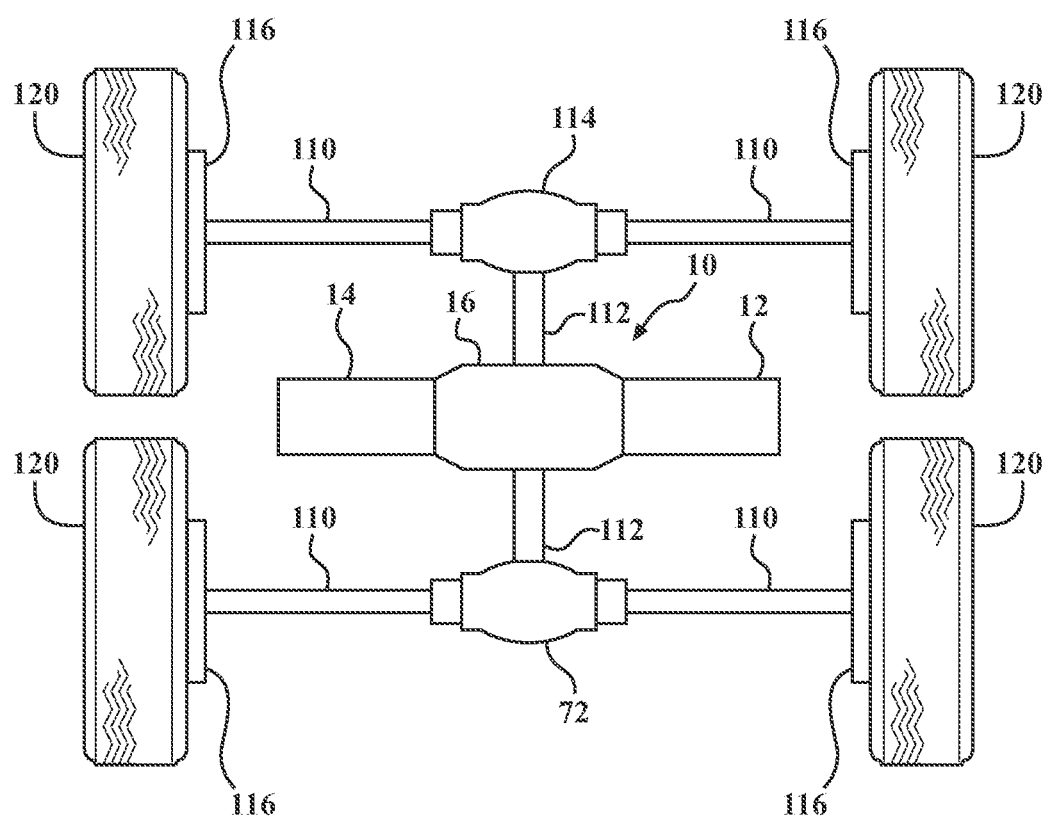
FIG. 8 is a schematic view of the transmission having two inputs wherein the transmission is operatively secured to two different differentials of two different axles.

Referring to FIG. 8, a third configuration for the transmission 10 is shown wherein the transmission 10 receives inputs from the first motor 12 (A-Motor) and the second motor 14 (B-Motor). The gearset 112 used to direct the torques provided by the output shaft 26 is mirrored so that the torques provided by the output shaft 26 may be directed in two directions to drive two axle differentials 114 to, in turn, drive the driven axles 110.

Figure 9:
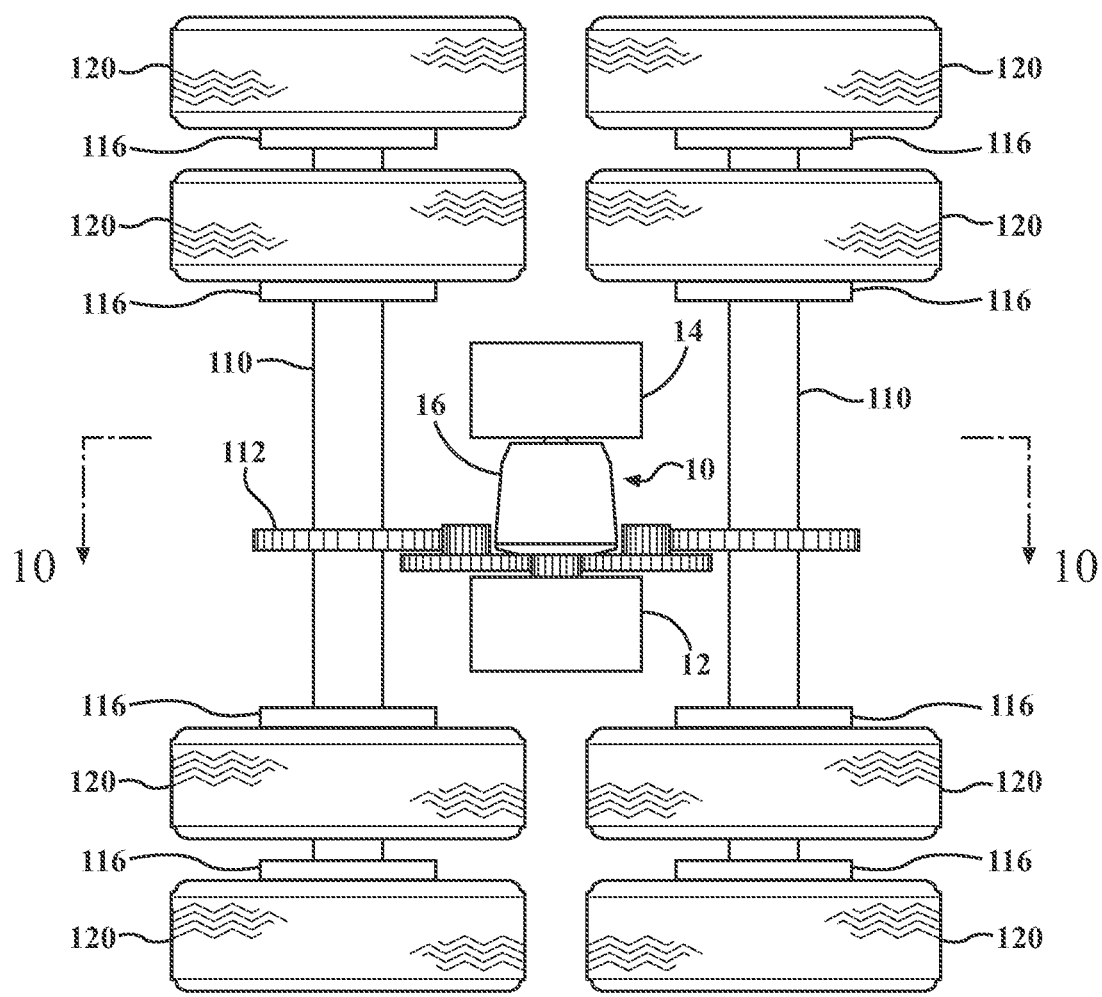
FIG. 9 is a top view of the transmission shown in FIG. 8 with exemplary gearing showing the connections to two axles.
Figure 10:
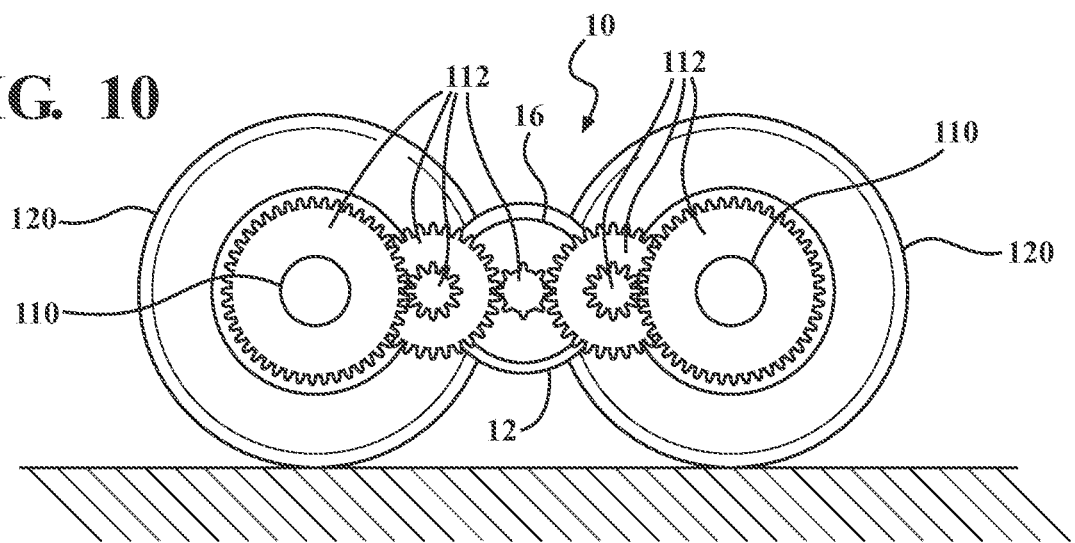
FIG. 10 is a side view taken along lines 10-10 of FIG. 9.

Referring to FIGS. 9 and 10, the third configuration of the transmission 10 is shown with an example gearset 112 shown directing output torque in two different directions to drive the two axles 110. This gearset 112 is shown to be in line with the output shaft 26, the transmission 10 and the motors 12, 14. Different configurations may be employed depending on the needs and the design parameters for such a system. It should be appreciated by those skilled in the art that other alignments may be used to, for instance, facilitate collection of lubricating fluids. Not shown is a housing that covers the gearset 112—such a housing should be well known to those skilled in the art.

Figure 11:
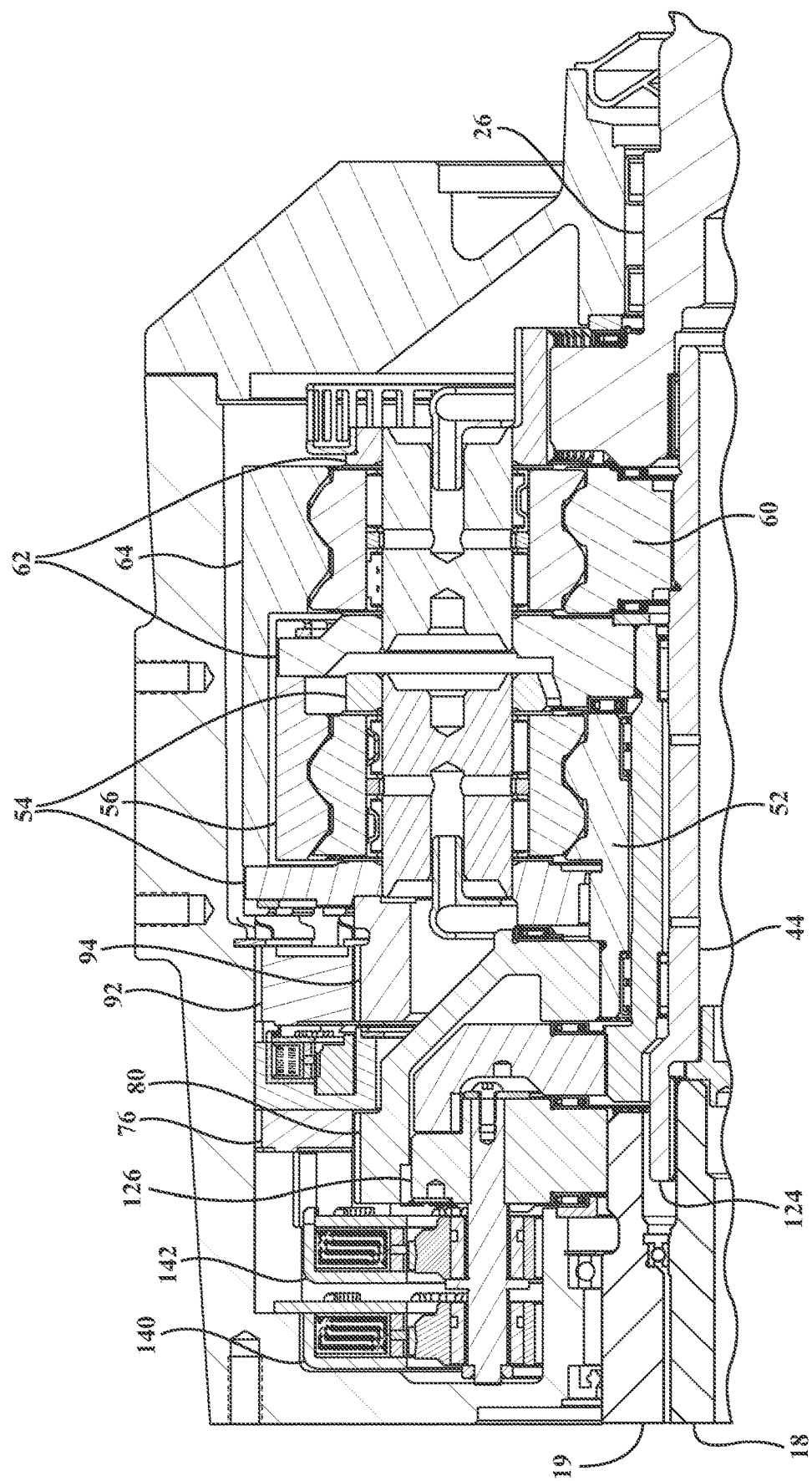
FIG. 11 is a bisected cross-sectional side view of the transmission having two inputs.

Referring to FIG. 11, the cross-sectional side view illustrates the two-input configuration of the transmission 10 shown in FIGS. 7 through 10 and discussed above (as stated above, elements discussed above will retain the same reference characters in this and any subsequent embodiment). In this embodiment, the input shaft 44 becomes the first input shaft 44. While the first input shaft 44 is identical to the input shaft 44 in the one-input embodiment discussed above, a coupling end 124 of the first input shaft 44 has the same outer diameter and a much larger inner diameter. In other words, the coupling end 124 of the first input shaft 44 is thinner than that of the input shaft 44 in the one-input embodiment shown in FIG. 4.

A second input shaft is a pocket plate 126. The second input shaft 126 is coaxial with the first input shaft 44. The second input shaft 126 receives torque from the second motor output shaft 19, whereas the coupling end 124 of the first input shaft 44 receives torque from a first motor output shaft 18 of the first motor 12. The first 12 (A-Motor) and second 14 (B-Motor) motors provide independent inputs into the transmission 10 to provide multiple modes of operation for the overall powertrain. The inputs of the first 12 and second 14 motors are torques that are transferred to the transmission 10 through the first 44 and second 126 input shafts.

Both first 12 and second 14 input motors are electric. These motors 12, 14 operate independently of each other and in concert with each other, depending on the mode in which the powertrain 10 is operating. In the power flow Figures that follow, the first input motor 12 and the second input motor 14 are designated as "A-Motor" and "B-Motor," respectively.

Figure 12:
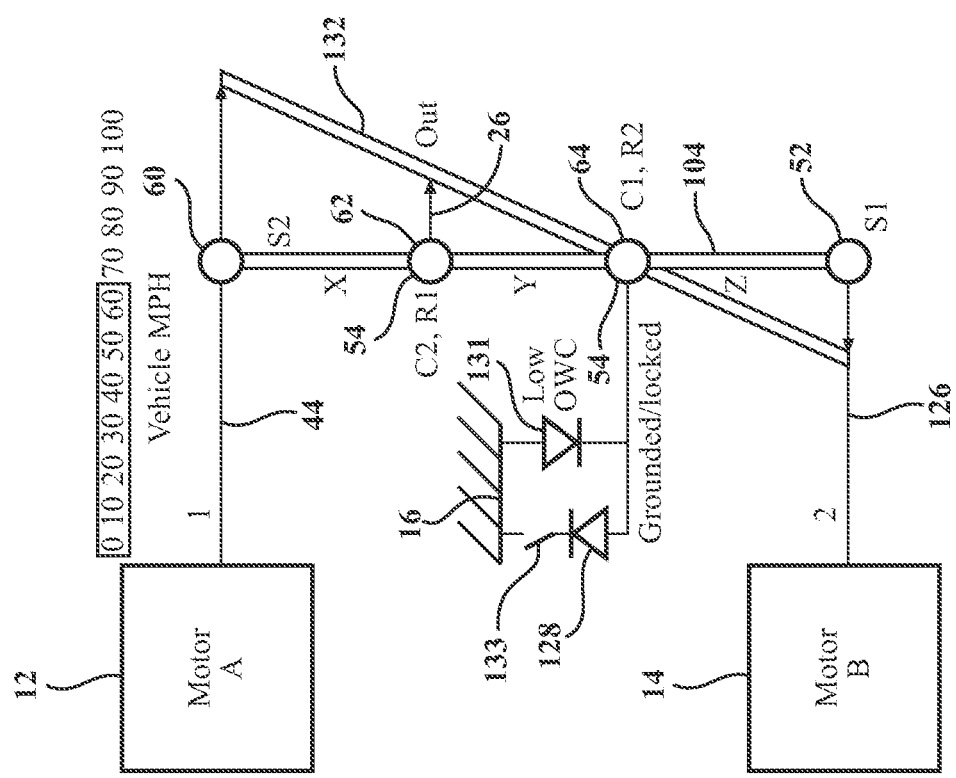
FIGS. 12 through 15 are lever diagrams of a transmission having two inputs.

Referring to FIG. 12, the transmission 10 is shown to be operating from launch through mid-range vehicle speeds (0-60 MPH). A low one-way clutch 131, represented by a diode is used to ground/lock (transmission housing 16) the second rotating member 54 (carrier C1) and the sixth rotating member 64 (ring gear R2). Another clutch 129 is switchable via switch 133 to allow the second rotating member 54 (carrier C1) and the sixth rotating member 64 (ring gear R2) to rotate.

Figure 16:
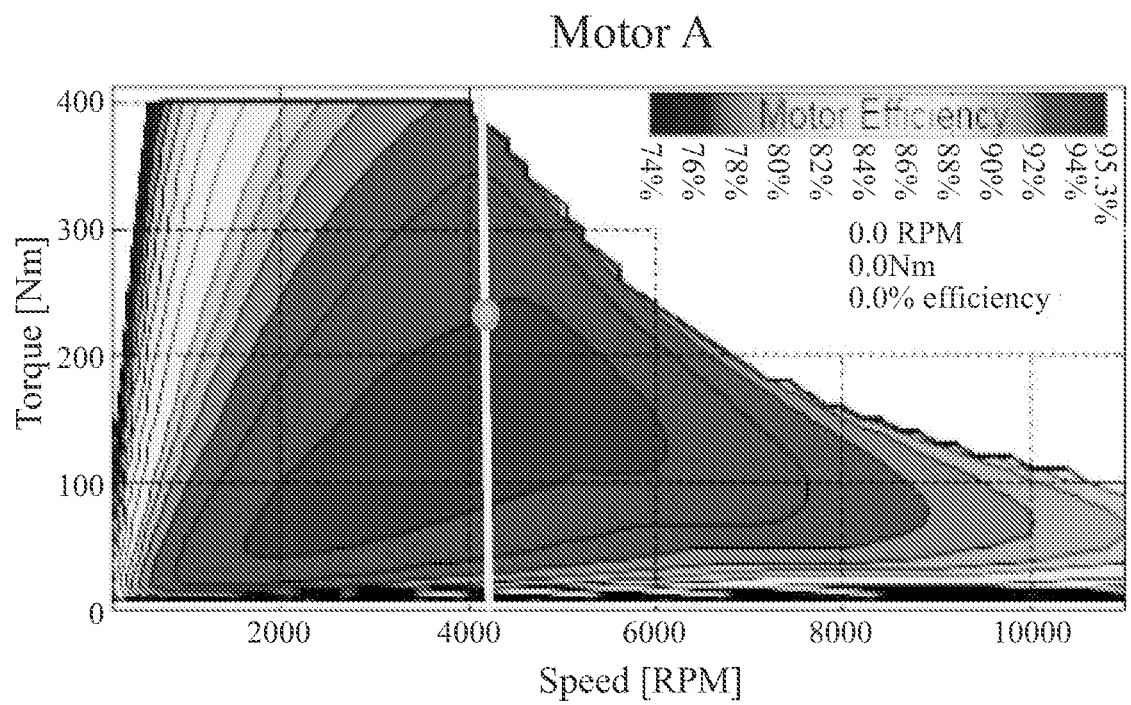
FIGS. 16 and 17 are graphs showing the output torque of two motors as a function of rotational speed wherein the rotational speed is maintained constant.
Figure 17:
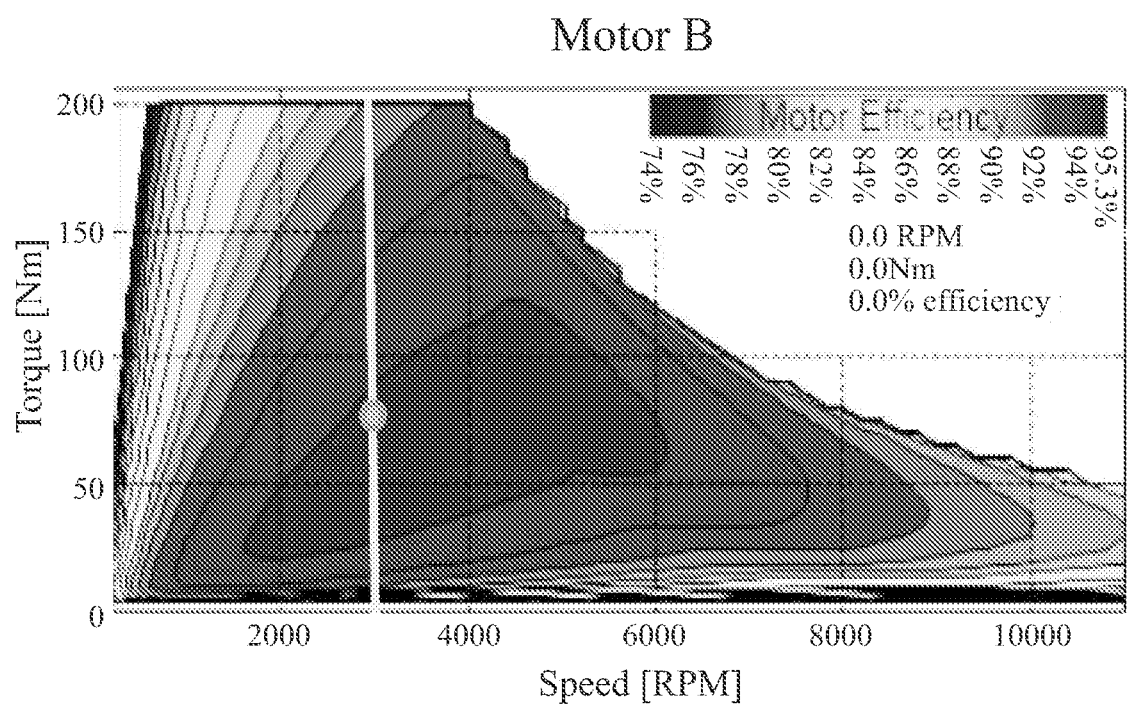

At these speeds, the transmission 10 is in Speed Ratio Mode (SRM). A lever 132 represents the output in SRM. In SRM, the speeds of the first 12 and second 14 motors are a fixed ratio relative to output speed. The first motor 12 has a ratio A to output and the second motor 14 has a ratio B to output. So, in SRM for a given vehicle speed, the speed of the motors 12, 14 are fixed relative to their corresponding ratios. This is best seen in FIGS. 16 and 17, where the vertical line represents a particular speed at which the first 10 and second 12 motors are operating. The goal is to provide the proper torque output at that speed to maximize the efficiency of the motors 12, 14. As can be seen in FIGS. 16 and 17, the center portions of the shaded graphed area are the ranges in which the motors 12, 14 are most efficient.

In SRM, the first motor 12 can be powered independently of second motor 14. The three operating states of the powertrain 10 in SRM include power the first motor 12 only; power the second motor 14 only; and power the two motors 12, 14 together at the same time.

While the speed of the motors 12, 14 relative to output is fixed via a ratio, the torques in each motor 12, 14 can vary from zero to maximum torque. The output torque is determined by this following formula $$T_{out} = T_A \frac{(X+Y)}{Y} + T_B\left(\frac{Z}{Y}\right) \quad \text{Equation 1}$$

where:

$T_A$=torque of the first motor 12;
$T_B$=torque of the second motor 14;

((X+Y)/Y) is the ratio for the first motor 12; and (Z/Y) is the ratio for the second motor 14.

The variables X, Y, and Z are determined by the sun and ring gear tooth counts in a ring-carrier/ring-carrier gearset. The variables are the same for all gearsets that can be defined by a four-node relationship. How X, Y and Z are calculated is dependent on the type of four-node lever relationship employed.

Figure 14:
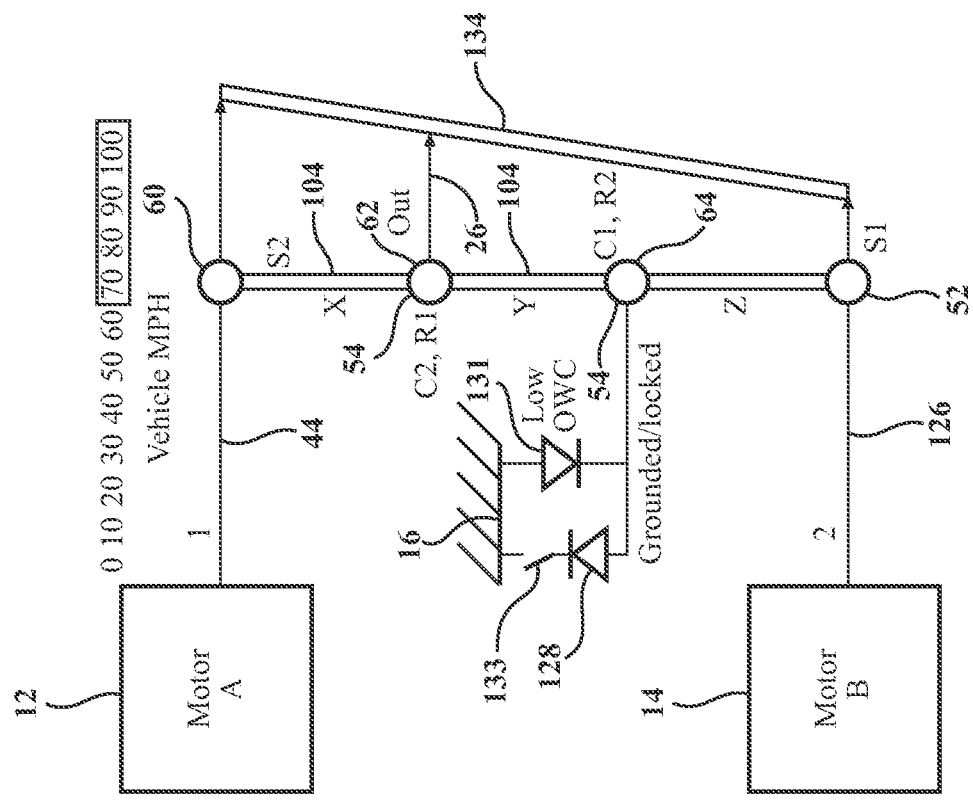
Figure 13:
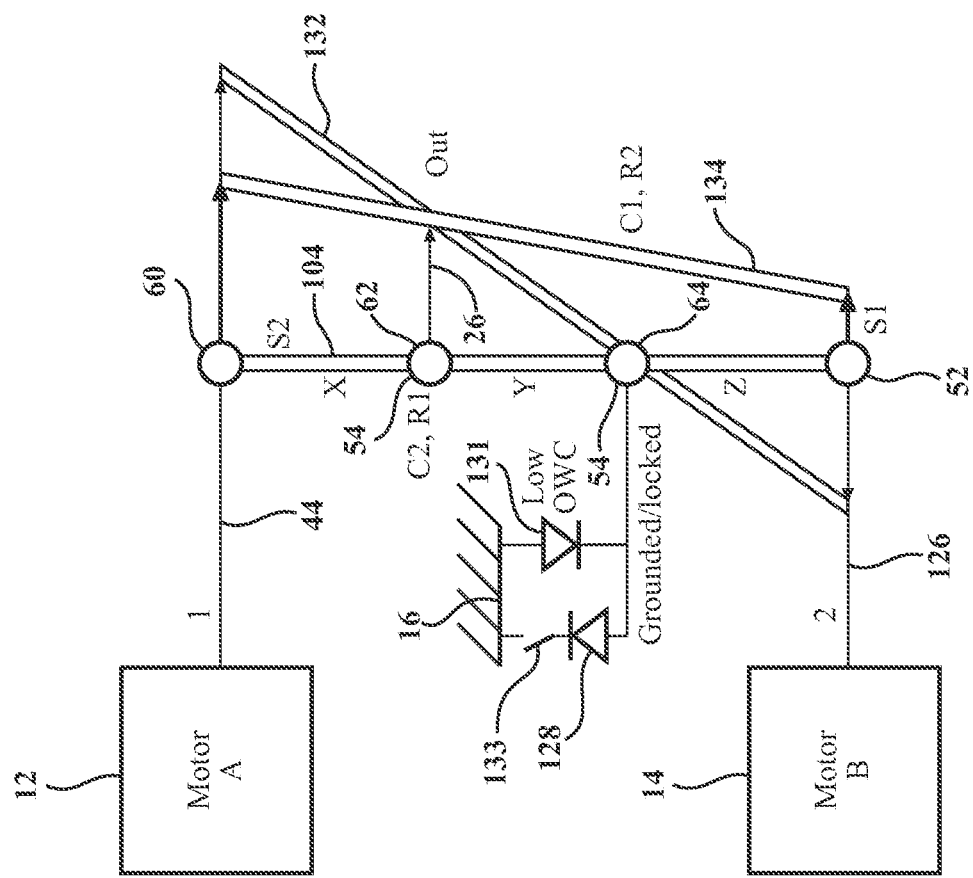
Figure 15:
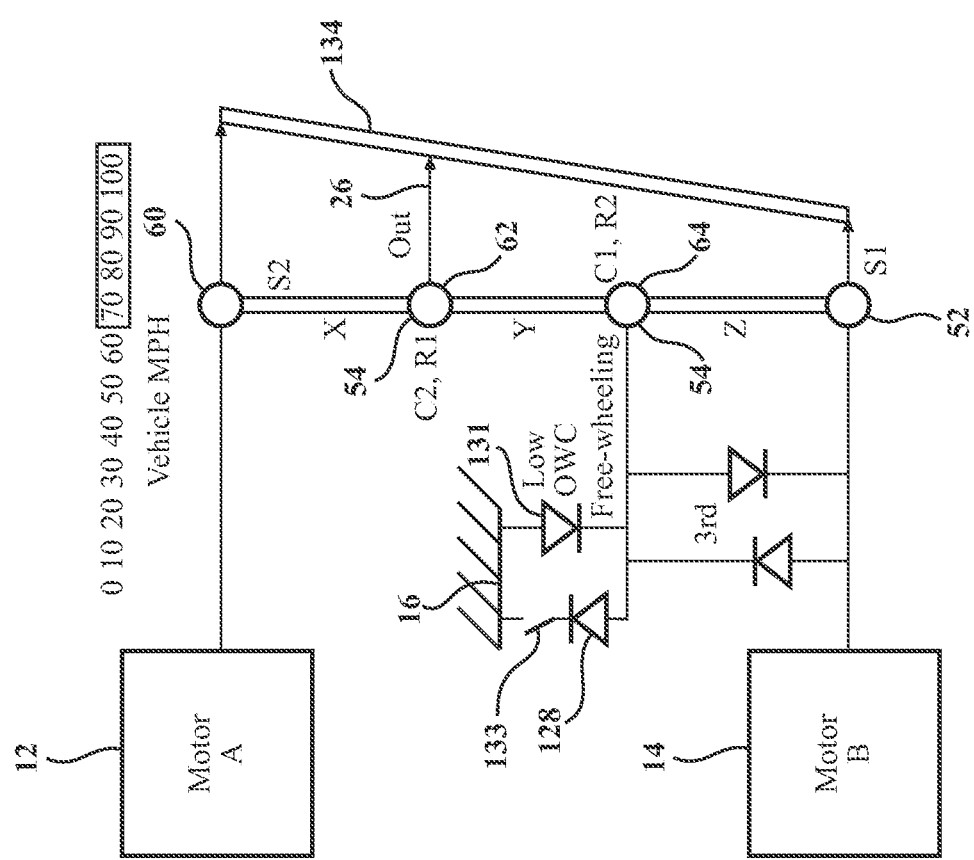

FIG. 13 illustrates a lever diagram showing the transmission 10 in transition from a speed ratio mode (as shown in FIG. 12) into a torque ratio mode. Again, the lever 132 represents the output in SRM, whereas the lever 134 represents the transmission 10 operating in a torque ratio mode (TRM). The benefit of operating in TRM is that it allows the efficient operation of the powertrain at higher vehicle speeds, as is shown in FIG. 14. The torque ratio mode is a CVT mode. The second motor 14 provides the reaction torque for the first motor 12 and vice versa. Since the ratios of the first motor 12 (A-Motor) are typically numerically larger than the numeric ratio of the second motor 14 (B-Motor), the torque provided by the second motor 14 will be the limiting torque. There are three formulas that must be adhered to in torque ratio mode. They include:

$$T_A + T_B = T_{out} \quad \text{Equation 2}$$

$$\Sigma M_{S1} = 0 = T_A(X+Y+Z) - T_{out}(Y+Z) \quad \text{Equation 3}$$

$$\Sigma M_{S2} = 0 = T_B(X+Y+Z) - T_{out}(X) \quad \text{Equation 4}$$

wherein $M_{S1}$ and $M_{S2}$ are defined as the moments about the first sun gear S1 and the second sun gear S2, respectively.

Figure 18:
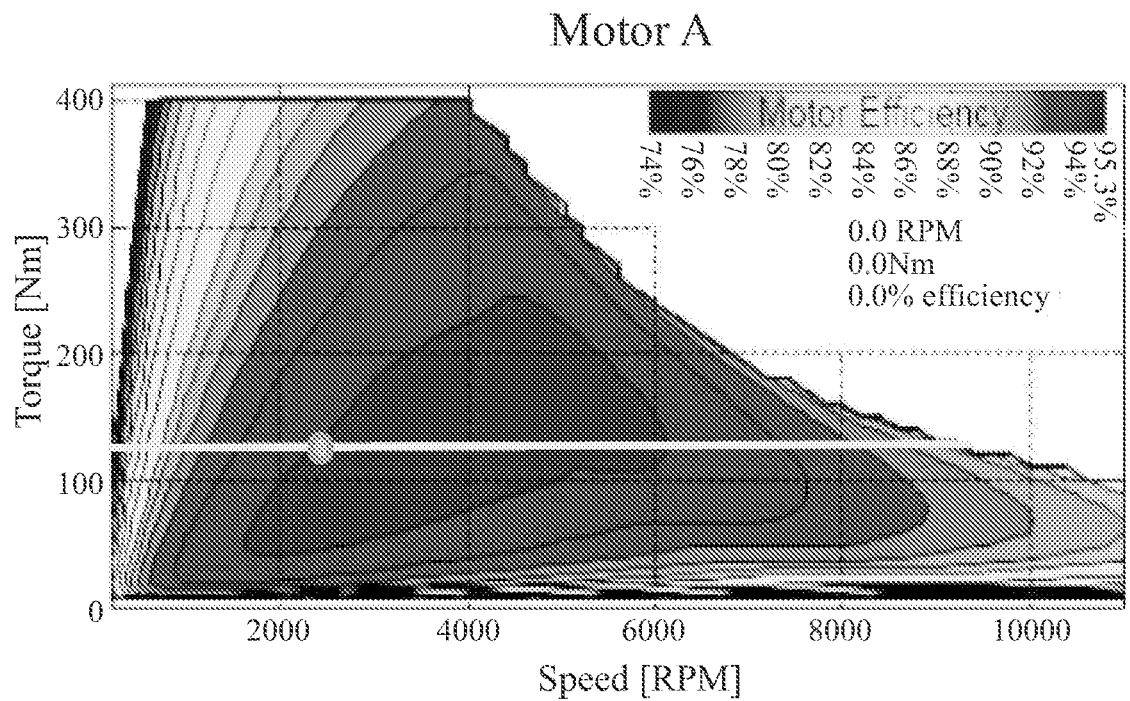
FIGS. 18 and 19 are the same two graphs as shown in FIGS. 16 and 17, respectively, wherein the torque is maintained constant.
Figure 19:
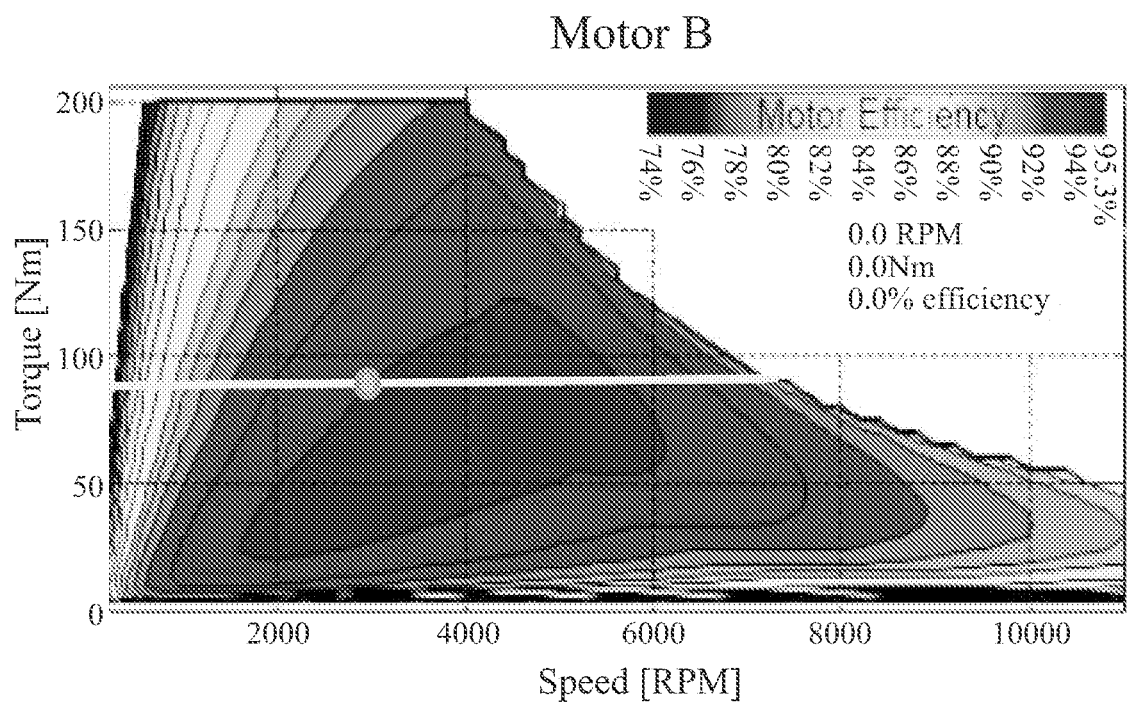

FIGS. 18 and 19 show the first motor 12 and the second motor 14 operating at a defined torque, as represented by the horizontal lines showing constant torque and how the speed of the motors 12, 14 varies to maximize efficiency. As with the speed ratio mode, the most efficient portion of the operation of the motors 12, 14 is in the darkest portion of the graph which is the center portion. It is ideal to operate in this range of speeds to maximize the efficiency of the motors 12, 14.

Figure 20:
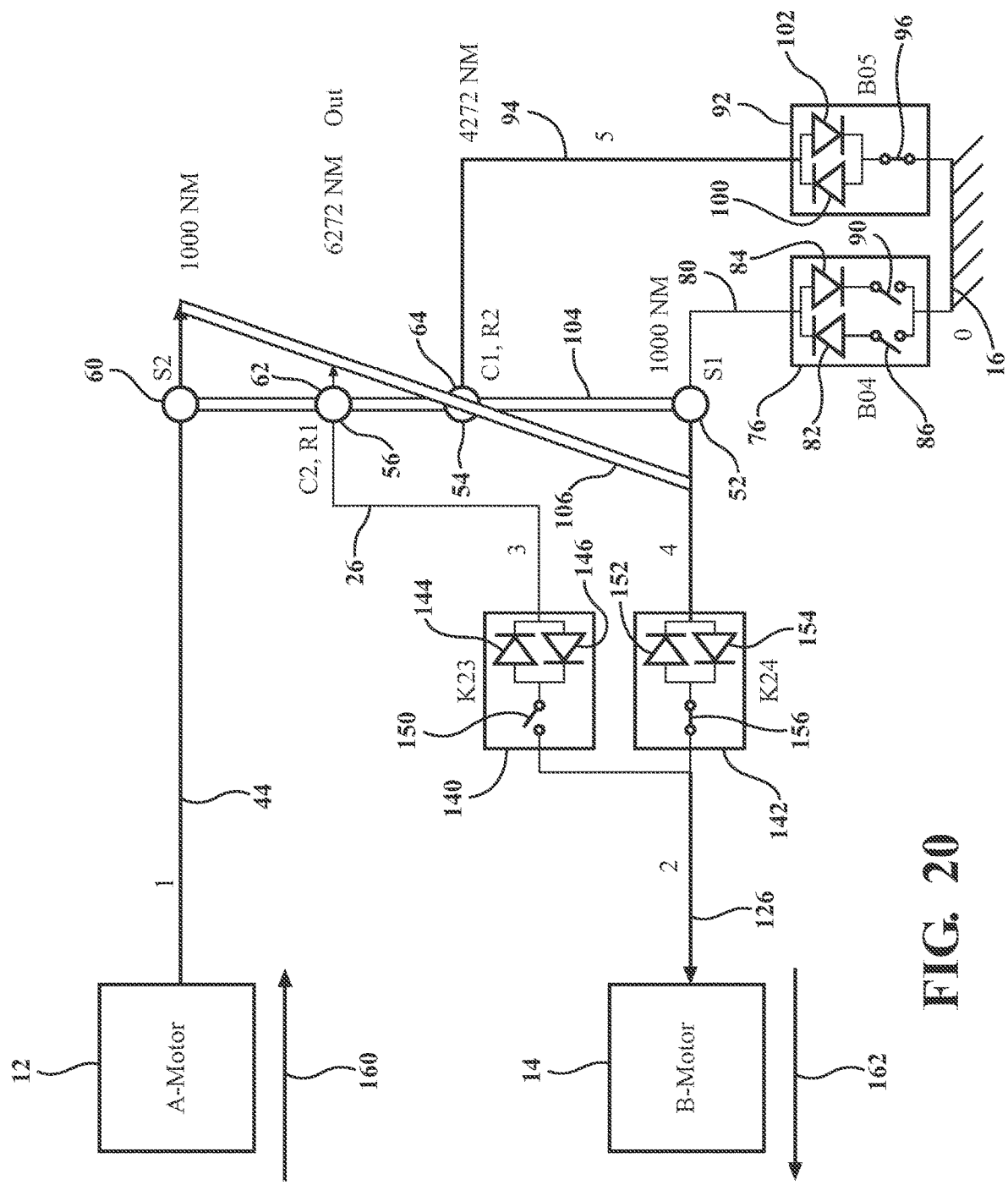
FIGS. 20 through 24 are lever diagrams of a second alternative embodiment of a transmission having two inputs.

Referring to FIG. 20, a lever diagram showing the transmission 10 having two inputs (FIGS. 1 and 11) is shown. The lever diagram is substantially similar to lever diagram for the single-input transmission shown in FIG. 5. One difference between the two configurations is the transmission 10 has two input shafts 44, 126, wherein the first input shaft 44 receives torque from the first motor 12 (A-Motor) and the second input shaft 126 receives torque from the second motor 14 (B-Motor). Another difference between the two configurations is the use of two controllable clutches 140 (K23), 142 (K24) instead of the single controllable clutch 66 (K13).

The output of the first motor 12 (A-Motor) is received by the first input shaft 44 (shaft 1), which is fixedly secured to the fourth rotating member 60 (sun gear S2) of the second gearset 50. The output of the second motor 14 (B-Motor) is received by the second input shaft 126 (shaft 2). The second input shaft 126 (shaft 2) is connected to the first controllable clutch 140 (K23) and the second controllable clutch 142 (K24). The first controllable clutch 140 (K23) operates in both directions as is indicated by the diodes 144, 146, which are oriented in opposite directions. A switch 150 illustrates that the clutch 140 (K23) is controllable and may be locked or allowed to rotate in both directions. The second controllable clutch 142 (K24) operates in both directions, as is indicated by the diodes 152, 154, which are oriented in opposite directions. A switch 156 illustrates that the controllable clutch 142 (K24) is controllable and may be locked or allowed to rotate in both directions.

The first controllable clutch 140 (K23) couples the second input shaft 126 (shaft 2) and the output shaft 26 (shaft 3). The second controllable clutch 142 (K24) couples the second input shaft 126 (shaft 2) with the fourth shaft 80 (shaft 4). As discussed above, the output shaft 26 is fixedly secured to both the third rotating member 56 (ring R1) of the first gearset 46 and the fifth rotating member 62 (carrier C2) of the second gearset 50.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects the transmission housing 16 (shaft 0) with a fourth shaft 80 (shaft 4). The first controllable brake 76 is similar to the controllable clutches 140, 142 in that it is represented by two diodes 82, 84 representing operation in either direction. The first controllable brake 76 is different from the controllable clutches 140, 142 in that each direction of operation can be controlled independently of the other, as represented by the two switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only can control whether a notch plate 94 (shaft 5) is rotating, or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock in both directions or it can move freely in both directions.

Because the first 46 and second 50 gearsets are ring-carrier/ring-carrier gearsets, the connections described in the power flow in FIG. 20, and the first 18 and second 19 motor output shafts are coaxial, the second motor 14 (B-Motor) is able to drive the output shaft 26 (shaft 3) directly. The number of modes of operation increase due to this capability. In the embodiments shown in the Figures, the first motor output shaft 18 extends through the second motor output shaft 19. As such, the second motor output shaft 19 is hollow providing a space through which the first motor output shaft 18 extends.

In FIG. 20, the steady-state lever 104 represent when the host vehicle is not in motion. The operational lever 106 represents when the vehicle is moving through the operation of the first motor 12 (A Motor) and/or the second motor 14 (B Motor). The first controllable clutch 140 (K23) is open as represented by the switch 150 being open. In addition, the second controllable clutch 142 (K24) is closed. Therefore, the second motor 14 (B Motor) is coupled to the first rotating member 52 (sun gear S1) of the first gearset 46. The first rotating member 52 (sun gear S1) is not grounded to the transmission housing 16 because the first controllable brake 76 (B04) is open. Finally, the second controllable brake 92 (B05) is closed tying the second rotating member 54 (carrier C1) of the first gearset 46 and the sixth rotating member 64 (ring gear R2) of the second gearset 50 are ground to the transmission housing 16 through the notch plat 94 (shaft 5).

In this configuration, the first motor 12 is operating in the forward direction, indicated by arrow 160, and the second motor 14 is operating in the reverse direction, indicated by arrow 162. By way of example, and in not to be limiting, exemplary torques are provided based on the designs of the gearsets 46, 50 and the motors 12, 14. Given the output of the first motor 12 (A Motor) provides a torque of 1000 NM on the second sun gear 60 (sun gear S2) and the output of the second motor 14 provides a torque of 1000 NM in the opposite direction on the first rotating member 52 (sun gear S1) results in a torque of 4272 NM on the second rotating member 54 (carrier C1) of the first gearset 46 and the sixth rotating member 64 (ring gear R2) of the second gearset 50 and an output torque of 6272 NM at the output shaft 26. This is "first gear."

Figure 21:
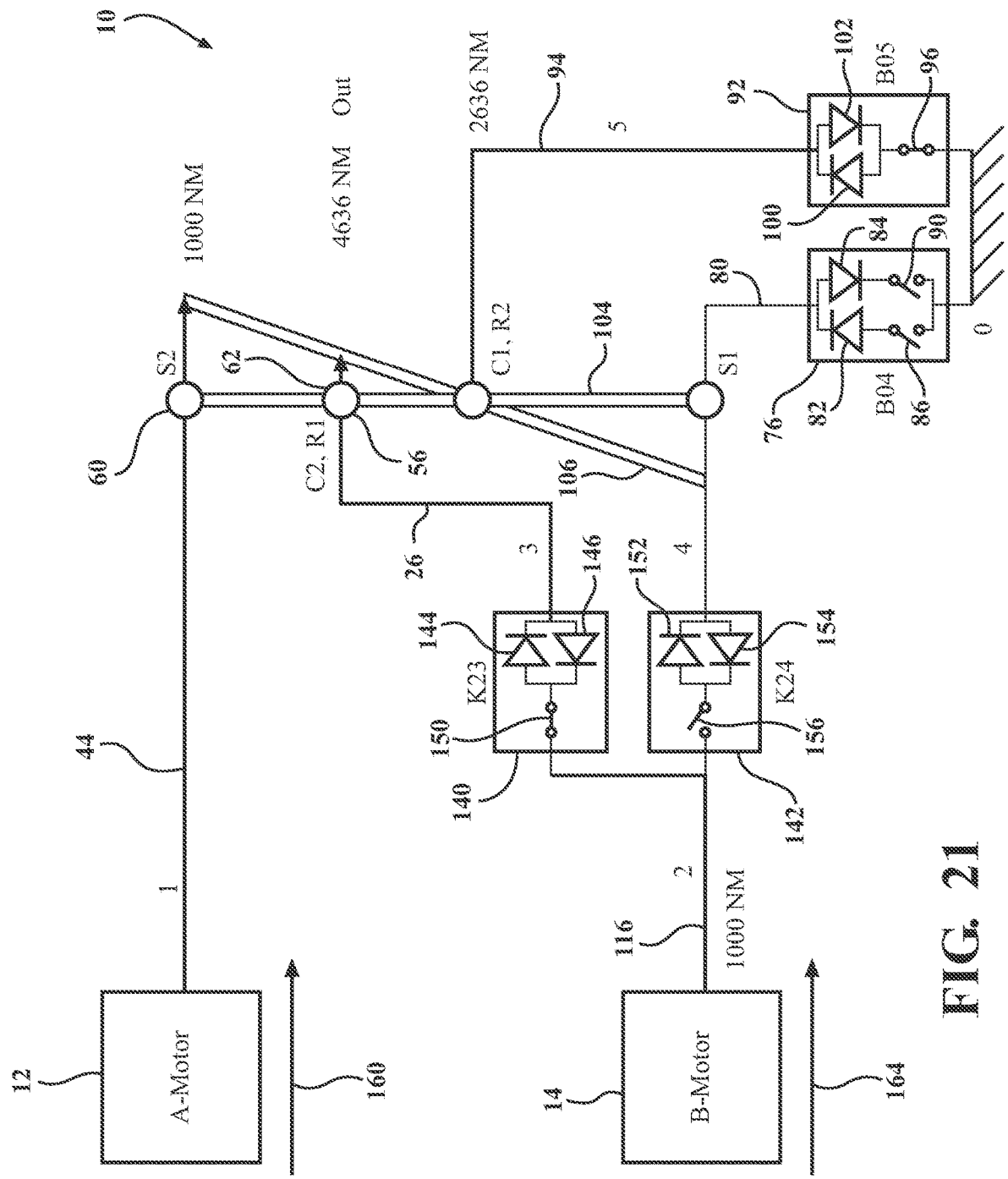

Referring to FIG. 21, this is the same embodiment as that of FIG. 20 with the transmission 10 in a different state. More specifically, the second motor 14 (B Motor) as an output of 1000 NM in the forward direction as is indicated by arrow 164. The first motor 12 (A Motor) continues to output a torque of 1000 NM in the forward direction as is indicated by the forward arrow 160. The first controllable clutch 140 (K23) is now closed and the second controllable clutch 142 is now open. With the first 76 and second 92 controllable brakes (B04 and B05) unchanged from the state they were in FIG. 26, the transmission 10 is in "second gear" with an output torque at the output shaft 26 of 4636 NM.

Figure 22:
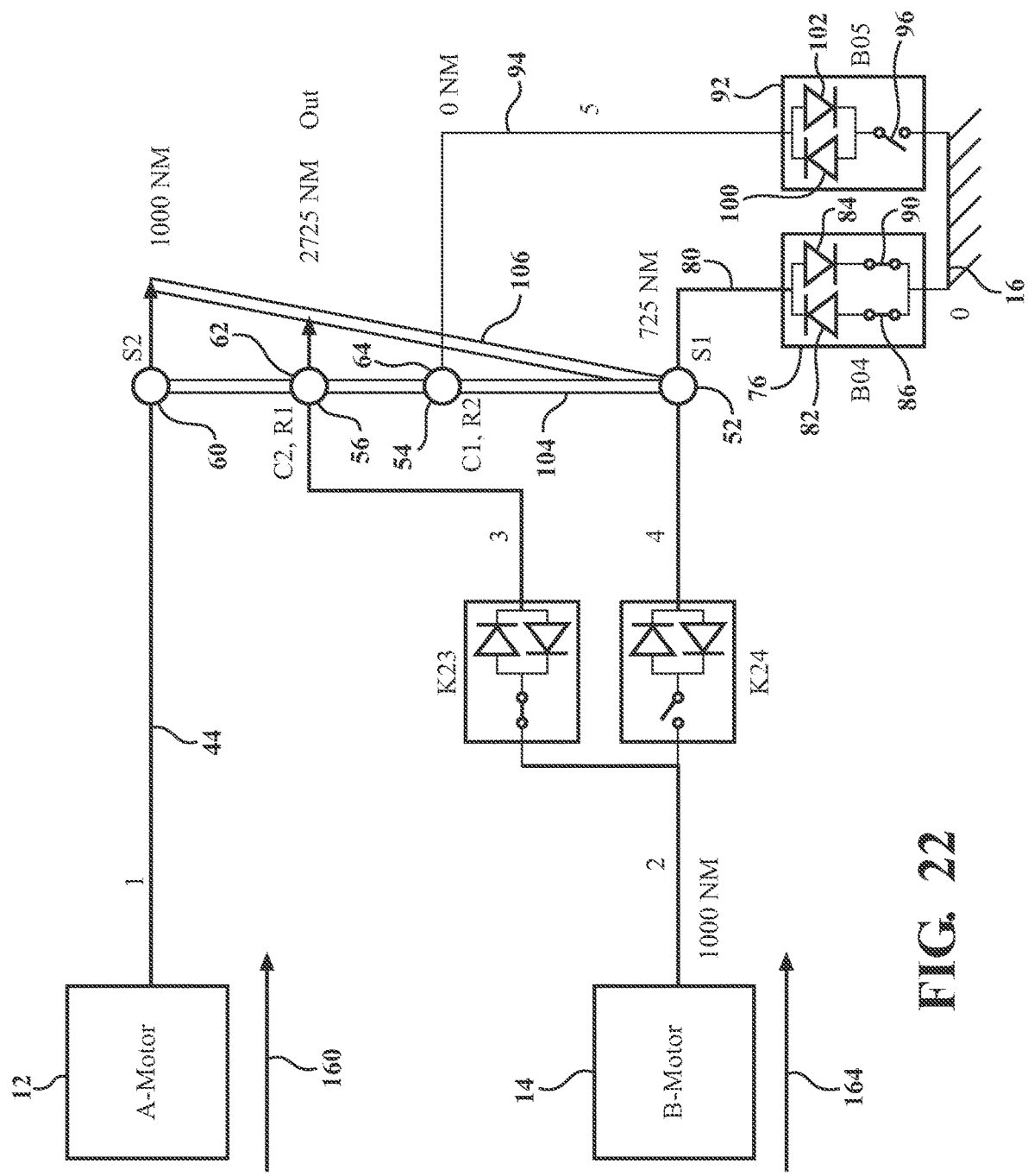

Referring to FIG. 22, the transmission 10 is now in "third gear." This is done by unlocking the second controllable brake 92 (B05), as represented by the open switch 96, and locking both directions of the first controllable brake 76, as represented by closing the two switches 86, 90 of the first controllable brake 76. Continuing with the example, the output shaft 26 (shaft 3) only receives 2725 NM of force in third gear.

Figure 23:
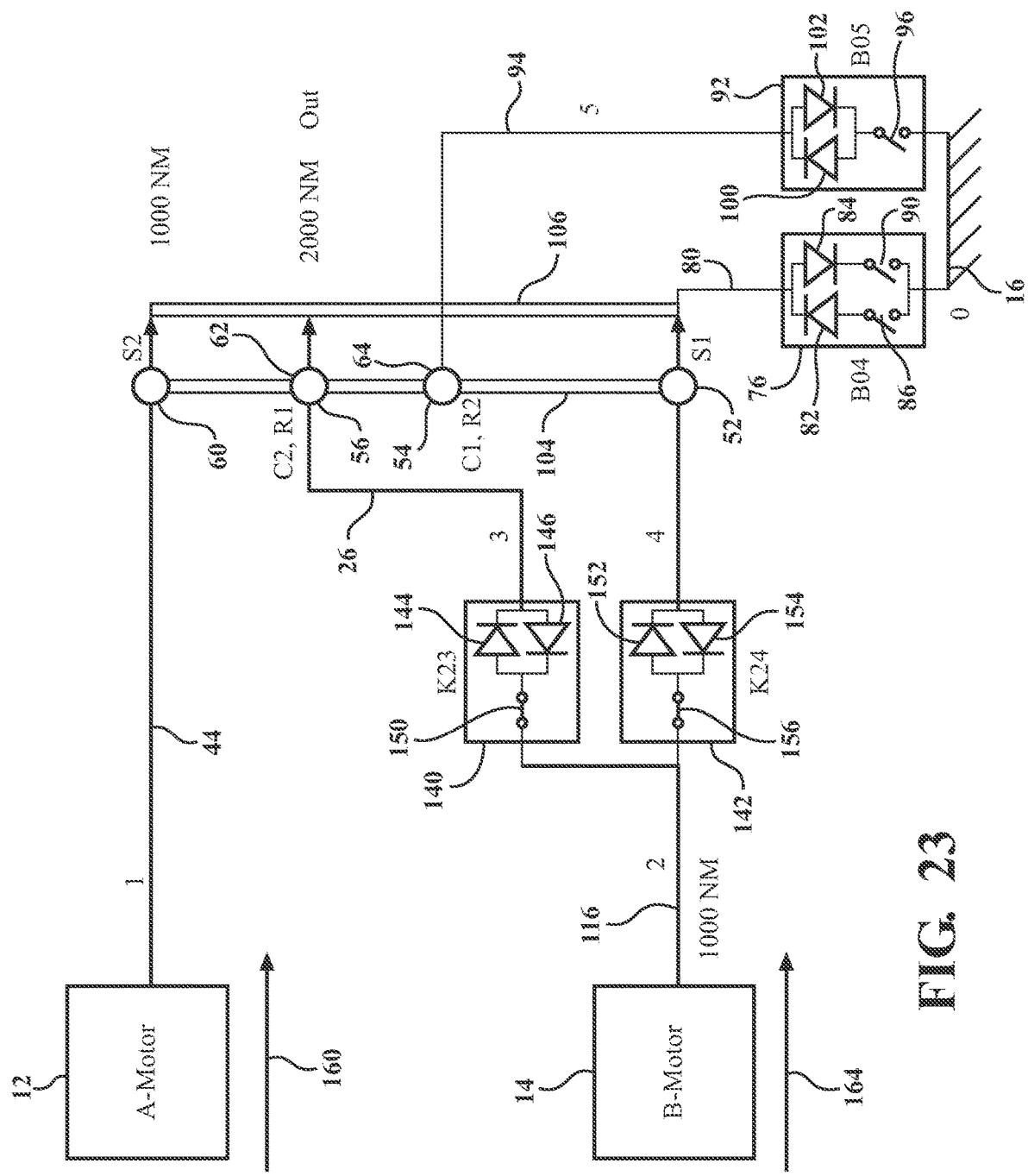

Referring to FIG. 23, the transmission 10 is shown in "fourth gear." Both controllable clutches 140, 142 (K23, K24) are closed allowing the second motor 14 (B-Motor) to apply torque to the first rotating member 52 (sun gear S1) as well as the output shaft 26 (shaft 3) via the combination of the third rotating member 56 (ring gear R1) and the fifth rotating member 62 (carrier C2). In addition, both controllable brakes 76, 92 (B04, B05) are opened such that none of the rotating members 52, 54, 56, 60, 62, 64 are ground to the transmission housing 16.

Figure 24:
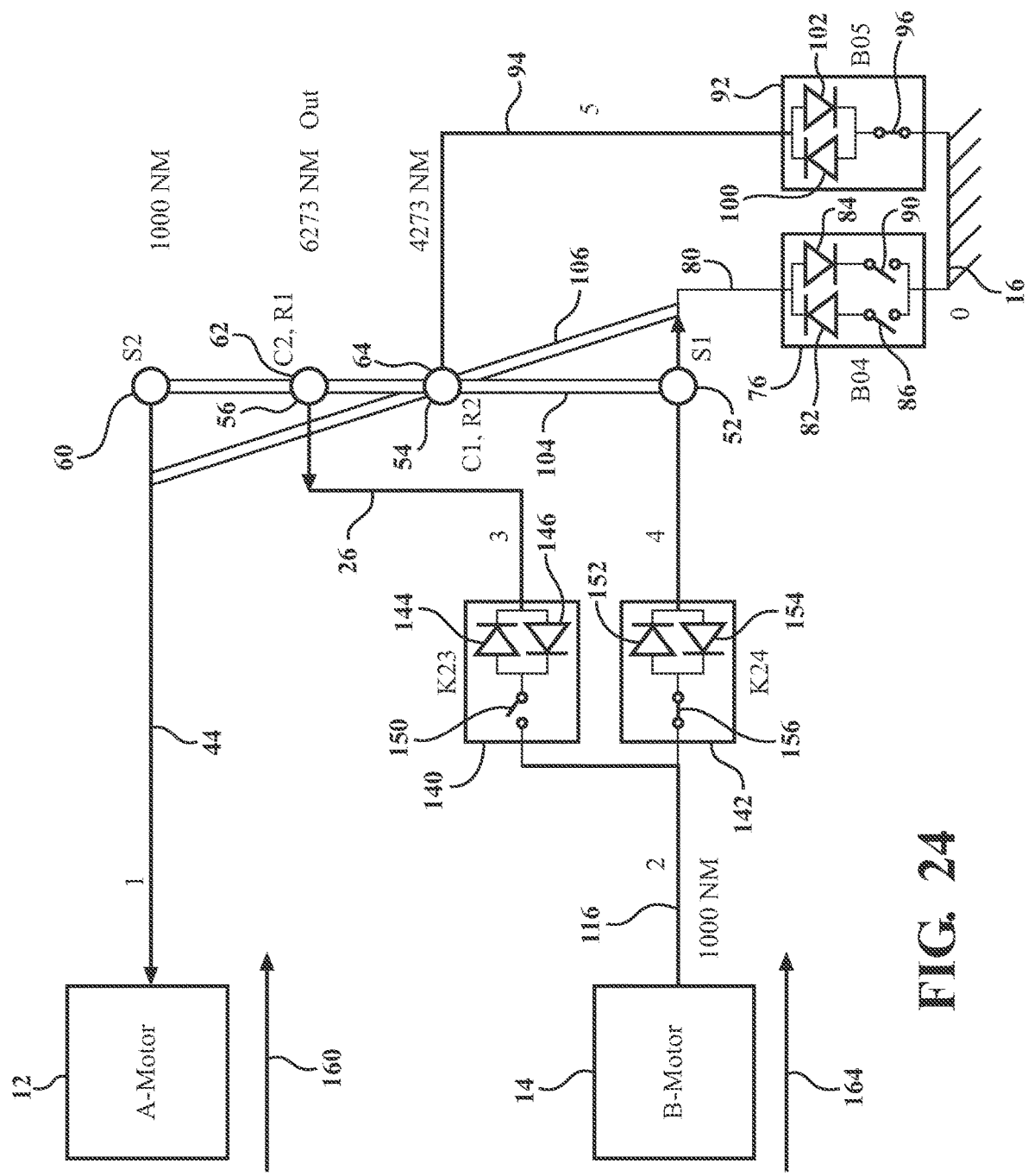

Referring to FIG. 24, the transmission 10 is now in "reverse." The first motor 12 (A-Motor) is run in the opposite direction, as is indicated by arrow 166. The first controllable clutch 140 (K23) is open removing the second motor 14 (B-Motor) from being connected to the output shaft 26 (shaft 3). The second controllable clutch 142 (K24) is closed providing a path for the torque generated by the second motor 14 (B-Motor) in the forward direction 164, which is received by the first rotating member 52 (sun gear S1). The first controllable brake 76 (B04) is open so the first rotating member 52 (sun gear S1) is not ground to the transmission housing 16. The second controllable brake 92 (B05) is closed tying the second rotating member 54 (carrier C1) and the sixth rotating member 64 (ring gear R2) to ground (transmission housing 16). Continuing with the numerical example started above, 1000 NM of reverse torque provided by the first motor 12 (A-Motor) and 1000 NM of forward torque provided by the second motor 14 (B-Motor) will result in 6273 NM of torque in the reverse direction at the output shaft 26 (shaft 3).

Figures 25A, 25B, 25C, 25D, 25E, 26:
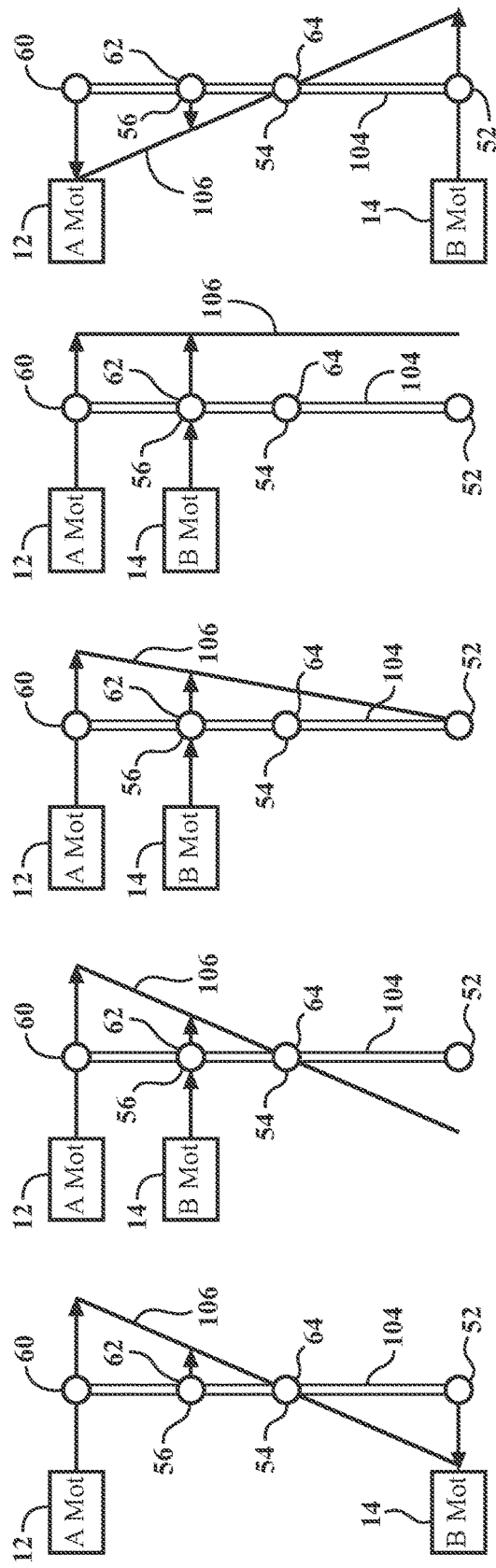
FIGS. 25A through 25E are simplified lever diagrams showing the connections between the two input motors and the transmission shown in FIGS. 20 through 24.
FIG. 26 is a table showing which clutches are on in the different modes of the second alternative embodiment of the transmission having two inputs.

FIGS. 25A through 25E are simplified representations of how the first motor 12 (A-Motor) and the second motor 14 (B-Motor) act on the lever that extends through the four nodes created by the first 46 and second 50 gearsets. In FIG. 25A, the first motor 12 is effectively asserting a torque in the forward direction against the top node of the lever 104 and the second motor 14 is asserting a torque in the reverse direction against the bottom node of the lever 104. The first motor 12 (A-Motor) maintains this configuration through FIG. 25D, which represents the first motor 12 (A-Motor) has the same output starting at "first gear" through "fourth gear." This results in the output shaft 26 (shaft 3) having a large torque in the forward direction commensurate with "first gear." In FIG. 25B, the second motor 14 (B-Motor) is applying a forwardly directed torque against the second node from the top, which also represents the output shaft 26 (shaft 3) and the second node of the four-node linkage (representing the second rotating member 54 (carrier C1) and the sixth rotating member 64 (ring gear R2)) is locked in place because the second controllable brake (B05) is grounding that node to the transmission housing 16. In FIG. 25C, the motors 12, 14 maintain the same configuration, but the bottom node of the four-node linkage, which is the first rotating member 52 (sun gear S1) is locked in place and cannot rotate due to the grounding of this member 52 to the transmission housing 16 (ground). In FIG. 25D, the motors 12, 14 maintain the same connections but all of the nodes of the four-node linkage are free to rotate, which is represented by the fact that the lever is generally parallel to the lever 104 representing the vehicle existing at 0 mph (at zero speed). In FIG. 25E, the second node is again locked to ground. In this configuration, the second motor 14 (B-Motor) is again coupled to the first rotating member 52 (sun gear S1) and the first motor 12 (A-Motor) is running in reverse, resulting in the output shaft 26 (shaft 3) having a torque in the reverse direction, such that the transmission 10 is in "reverse."

Referring to FIG. 26, a table of the different modes in which the transmission operates based on the clutch activation is shown. For the varying modes, "A1B1" is "first gear," "A1B2" is "second gear," "A2B2" is "third gear, "A3B2" is fourth gear and "Rev" is "reverse." The transmission 10 in the configuration shown in FIGS. 11 and 20 through 24 also can operate in two additional modes, "Park" and "Hill Hold." By turning both of the controllable brakes 76, 92 on, the bottom two nodes of the four-node linkage are coupled to the transmission housing 16, resulting in no movement of the transmission 10. This is a "park" state preventing movement of the vehicle. In "Hill Hold" mode, only one of the diodes 82, 84 is turned on, preventing the vehicle from rolling down a hill. This is useful when stopped on a hill. The direction the vehicle is in when it is on the hill will dictate which of the two switches 86, 90 of the first controllable clutch 76 (B04) is turned on.

Figure 28:
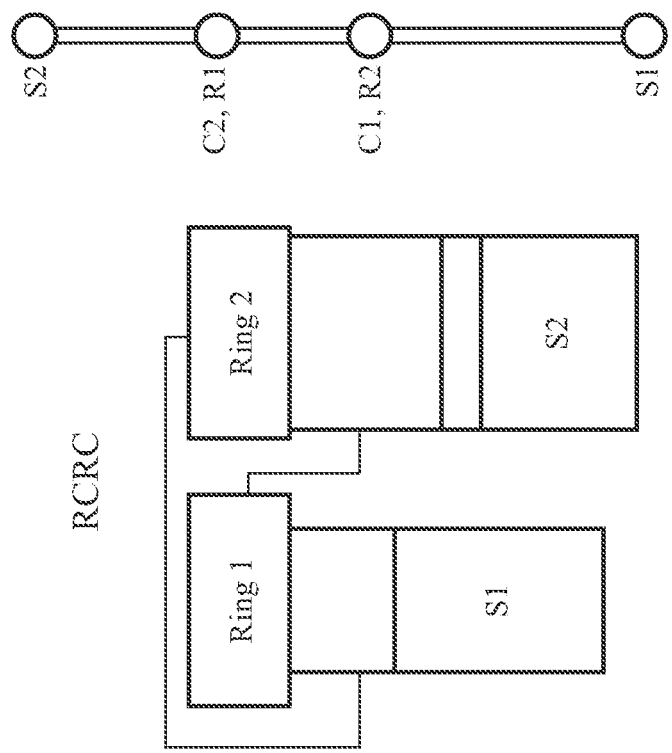
FIG. 28 is a block diagram of a ring-carrier/ring-carrier gearset and a representative lever diagram thereof.
Figure 27:
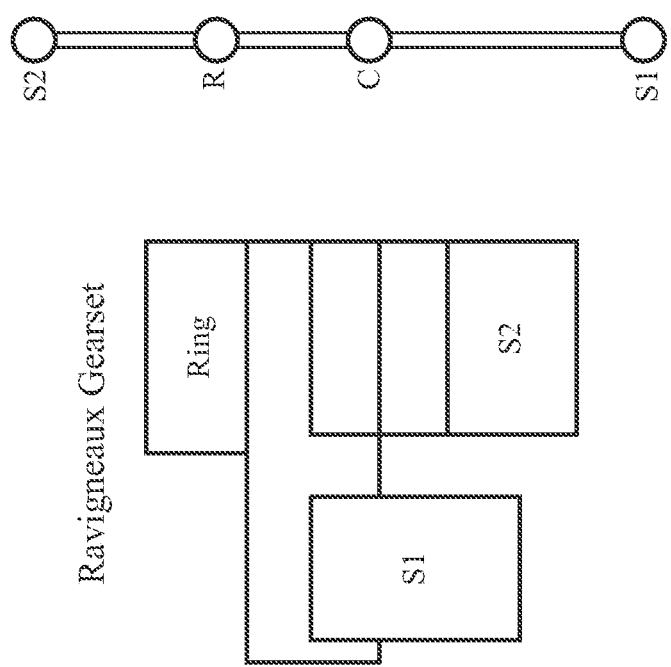
FIG. 27 is a block diagram of a Ravigneaux gearset and a representative lever diagram thereof.
Figure 29:
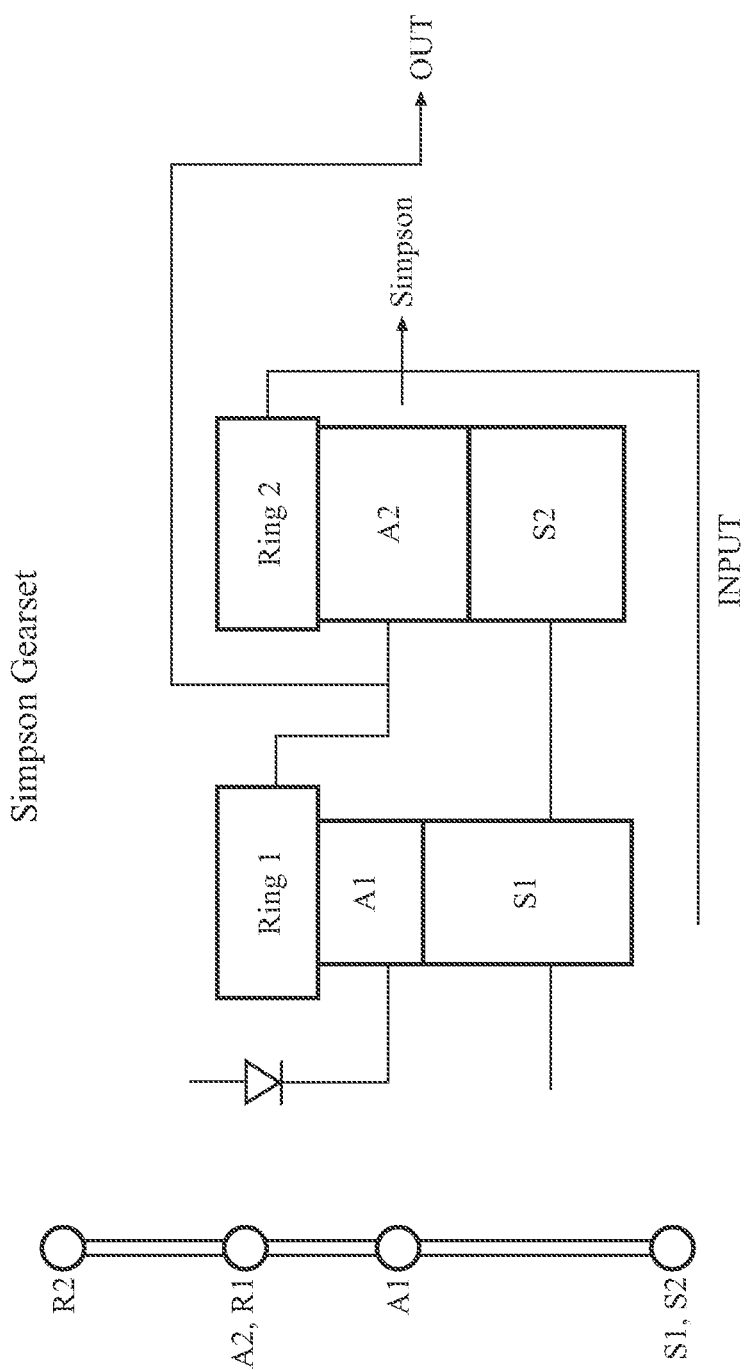
FIG. 29 is a block diagram of a Simpson gearset and a representative lever diagram thereof.

FIGS. 27, 28 and 29 are block diagrams of three types of four-node linkage relationships for transmissions having two sets of gears. FIG. 27 illustrates a Ravigneaux gearset and the respective four-node linkage representation thereof. FIG. 28 represents a ring-carrier/ring-carrier gearset and the respective four-node linkage representation thereof. And FIG. 29 illustrates a Simpson gearset and the respective four-node linkage representation thereof.

Three Input Configuration

Figure 30:
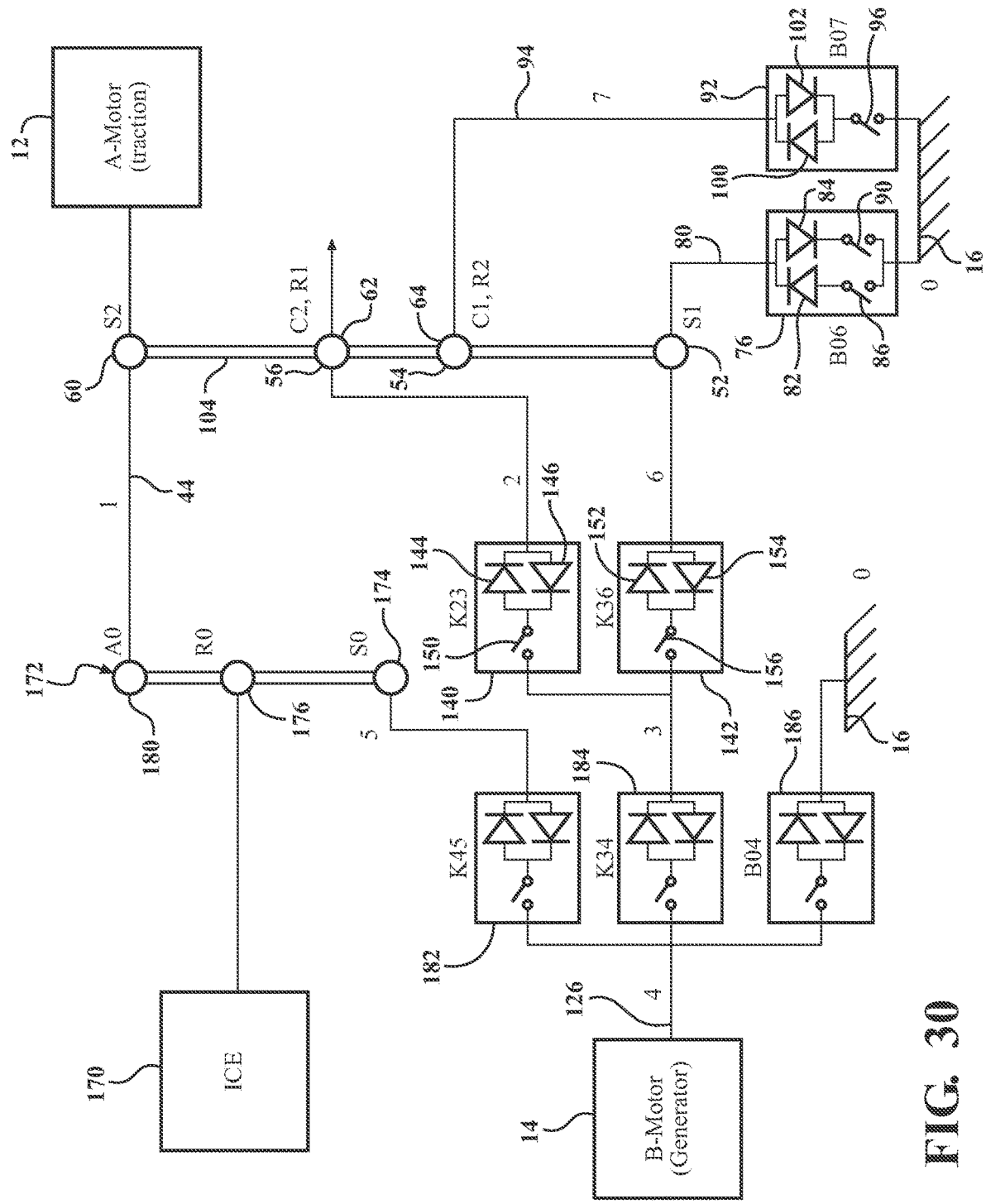
FIG. 30 is a lever diagram of a third alternative embodiment of a transmission having three inputs.

Referring to FIG. 30, the transmission 10 is shown in a configuration that includes three inputs. In the embodiment shown, the three inputs include the first motor 12 (A-Motor), the second motor 14 (B-Motor) and an internal combustion engine 170 (ICE). As stated above, the elements described above will have the same reference characters in when described in this section. While some of the parenthetic nomenclature changes (additional shafts require different connections), the reference characters will remain unchanged from above.

The first controllable clutch 140 (K23), the second controllable clutch (K36), the first controllable brake 76 (B06), the second controllable brake (B07) and the four-node linkage representing first 46 and second 50 gearsets are all connected in the same configuration as was discussed above.

The addition of the internal combustion engine 170 (ICE) requires the addition of a third gearset 172 having a seventh rotating member 174 (sun gear S0), an eighth rotating member 176 (ring gear R0) and a ninth rotating member 180 (annulus A0). The output of the internal combustion engine 170 (ICE) is coupled to the eighth rotating member 176 (ring gear R0). The ninth rotating member 180 (annulus A0) is coupled to the first input shaft 44 (shaft 1), which is coupled to the fourth rotating member 60 (sun gear S2). The seventh rotating member 174 (sun gear S0) is operatively connected to the second motor 14 (B-Motor) through a third controllable clutch 182 (K45).

The second motor 14 (B-Motor) is also coupled to the second controllable clutch 142 (K36) through a fourth controllable clutch 184 (K34). Finally, the second motor 14 (B-Motor) is also coupled to the transmission housing 16 (ground) through a third controllable brake 186 B04).

The operation of the transmission 10, when it incorporates the use of the internal combustion engine 170 (ICE) as depicted in FIG. 30, the modes of operation include the use of the transmission 10 without the use of the internal combustion engine 170 (ICE). This is the EV Mode (the first four rows of the table shown in FIG. 37). Hybrid Mode is shown in the next four rows wherein the first motor 12 (A-Motor), the second motor 14 (B-Motor) and the internal combustion engine 170 (ICE) all provide torques during certain defined conditions in the operation of the vehicle. The transmission 10 may operate in gas only mode, as is indicated in the next two rows identified by "ICE." These modes rely exclusively on the torque provided by the internal combustion engine 170 (ICE). "Park" Mode is the next row, which identifies when the vehicle has a zero speed and is not engaged to move. "Hill Hold" Mode is a mode that allows the vehicle to maintain a position on a hill while being ready to move in a direction opposite the direction of the hill. The last mode is "Generator" Mode whereby the vehicle can use the second motor 14 (B-Motor) as a generator to power or charge a device or circuit (neither shown) that is electrically connectable to an electrical port/outlet (not shown) that is electrically connected to the second motor 14 (B-Motor). The controllable clutches 140, 142, 182, 184 and the controllable brakes 76, 92, 186 are identified in the table in FIG. 37 to show which of these devices are active to facilitate any one of the modes identified above and in FIG. 37.

Figure 32:
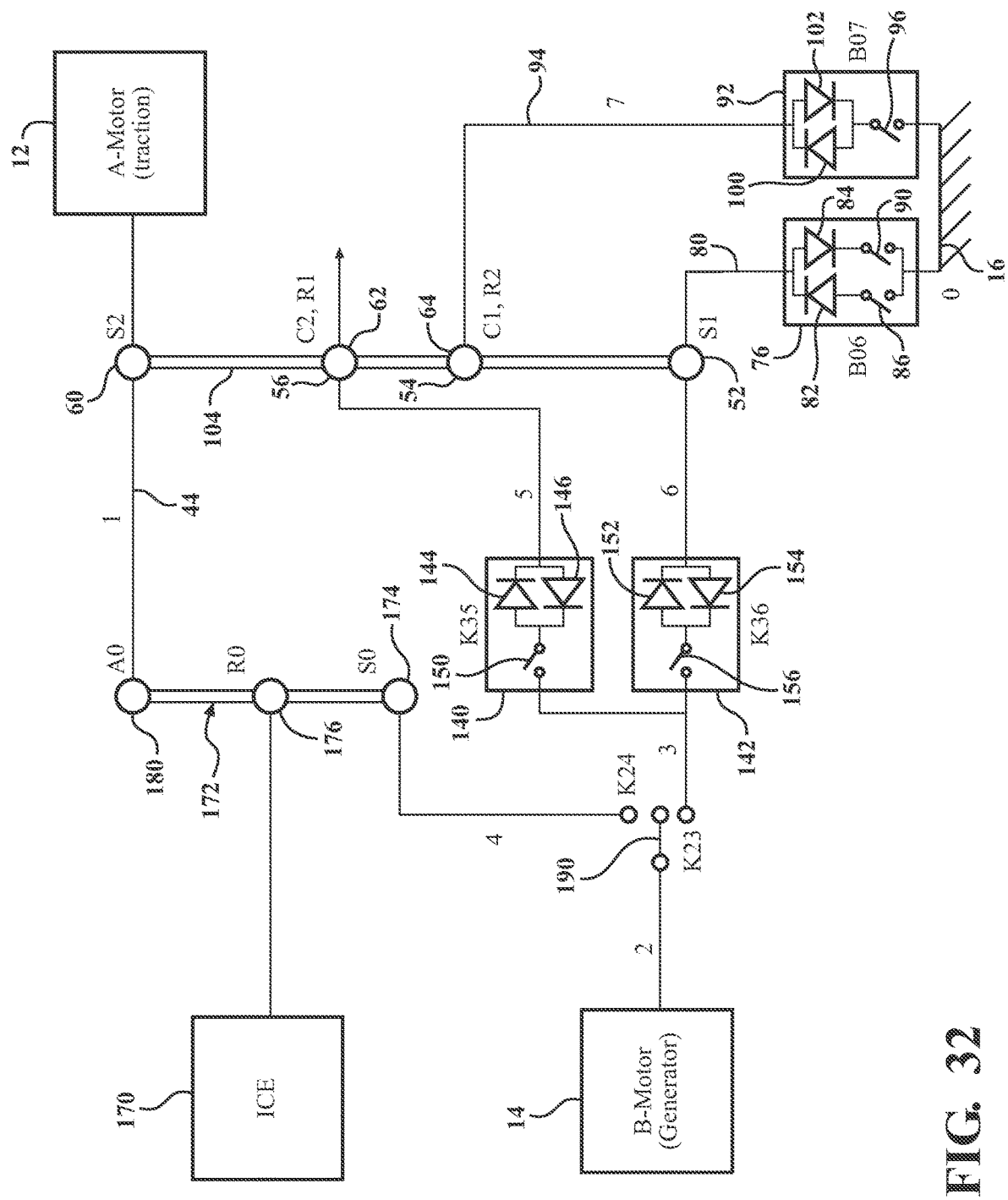
FIGS. 32 through 36 are lever diagrams of differing embodiments a transmission having three inputs.

Referring to FIG. 32, another embodiment of the three-input configuration is shown. The difference between the embodiment shown in FIG. 30 and that which is shown in FIG. 32 is the type of clutches used. In the embodiment shown in FIG. 30, the third controllable clutch 182 (K45), the fourth controllable clutch 184 (K34) and the third controllable brake 186 (B04) are all binary devices. These devices 182, 184, 186 are all replaced with a single three-position clutch 190, wherein the three-position clutch 190 couples shaft 2 to shaft 4 connecting the second motor 14 (B-Motor) to the seventh rotating member 174 (sun gear S0) in one position; it couples the second motor 14 (B-Motor) to the second controllable clutch 142 (K36); or, it leaves the second motor 14 (B-Motor) detached from the rest of the transmission 10.

Figure 33:
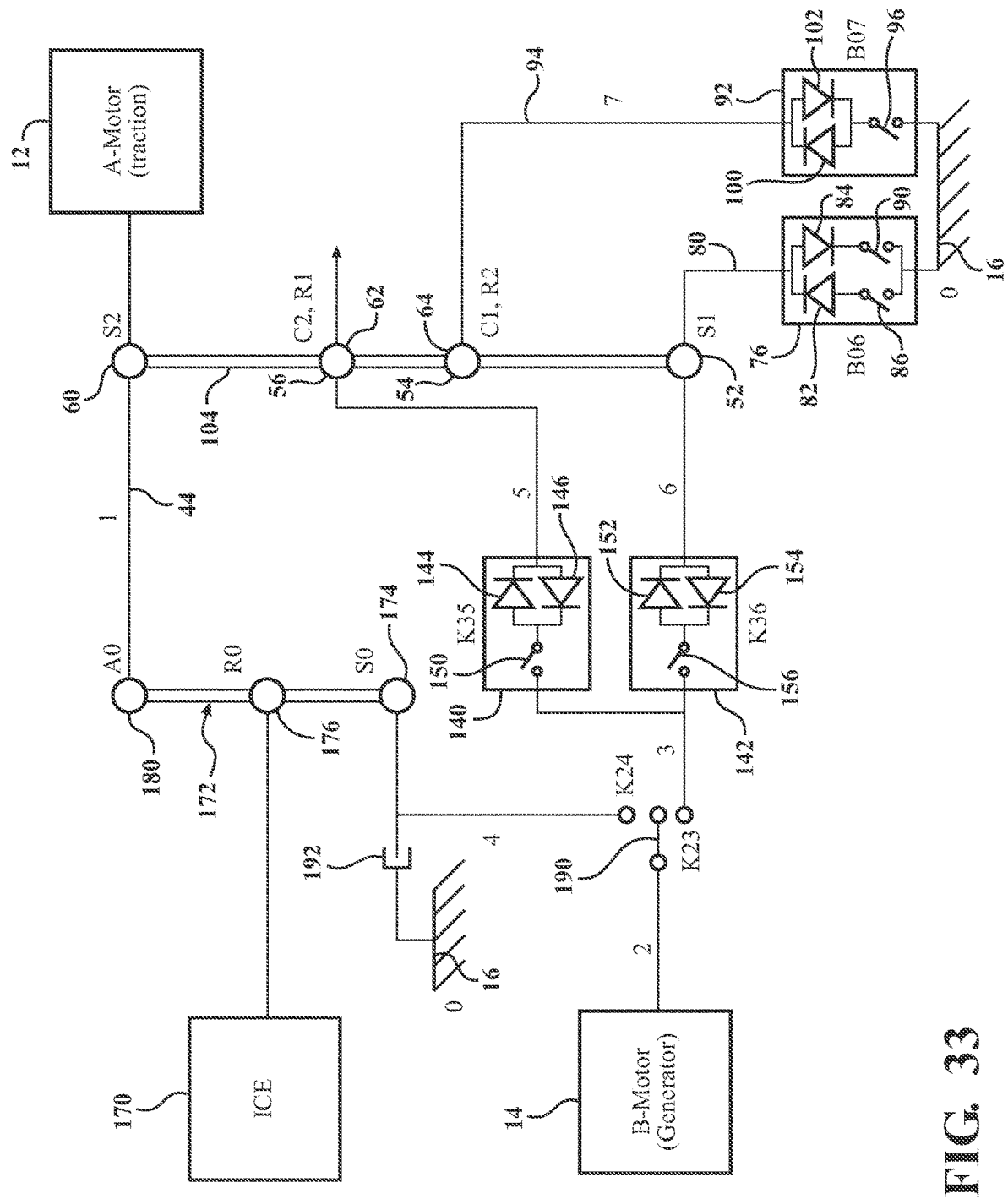

Referring to FIG. 33, the embodiment shown is similar to that which is shown in FIG. 32. In addition to the three-position clutch 190, a brake 192 (B04) is added between the three-position clutch 190 and the seventh rotating member 174 (sun gear S0). This brake 192 (B04) grounds the seventh rotating member 174 (sun gear S0) to allow the internal combustion engine 170 (ICE) to operate in an overdrive mode.

Figure 34A:
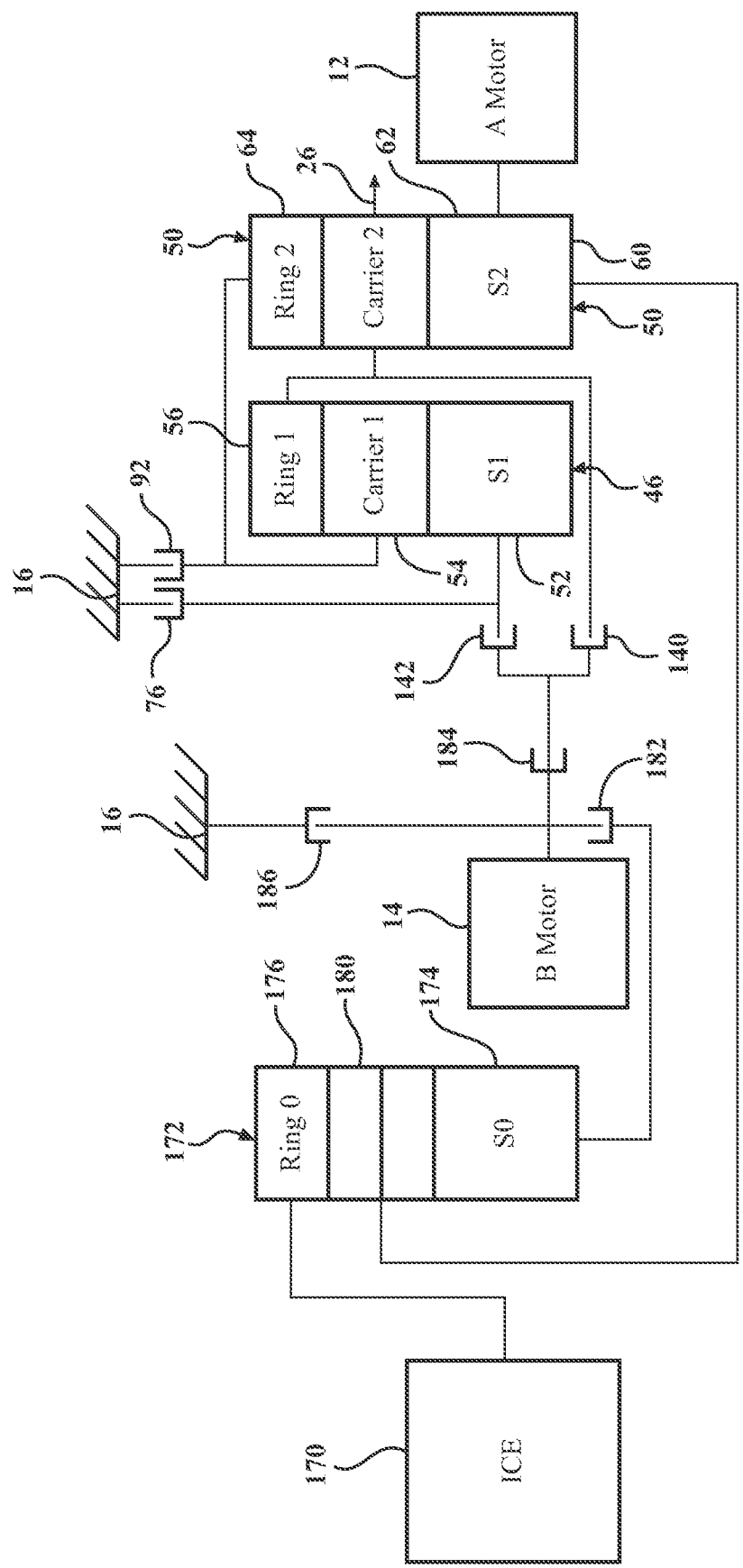
Figure 34B:
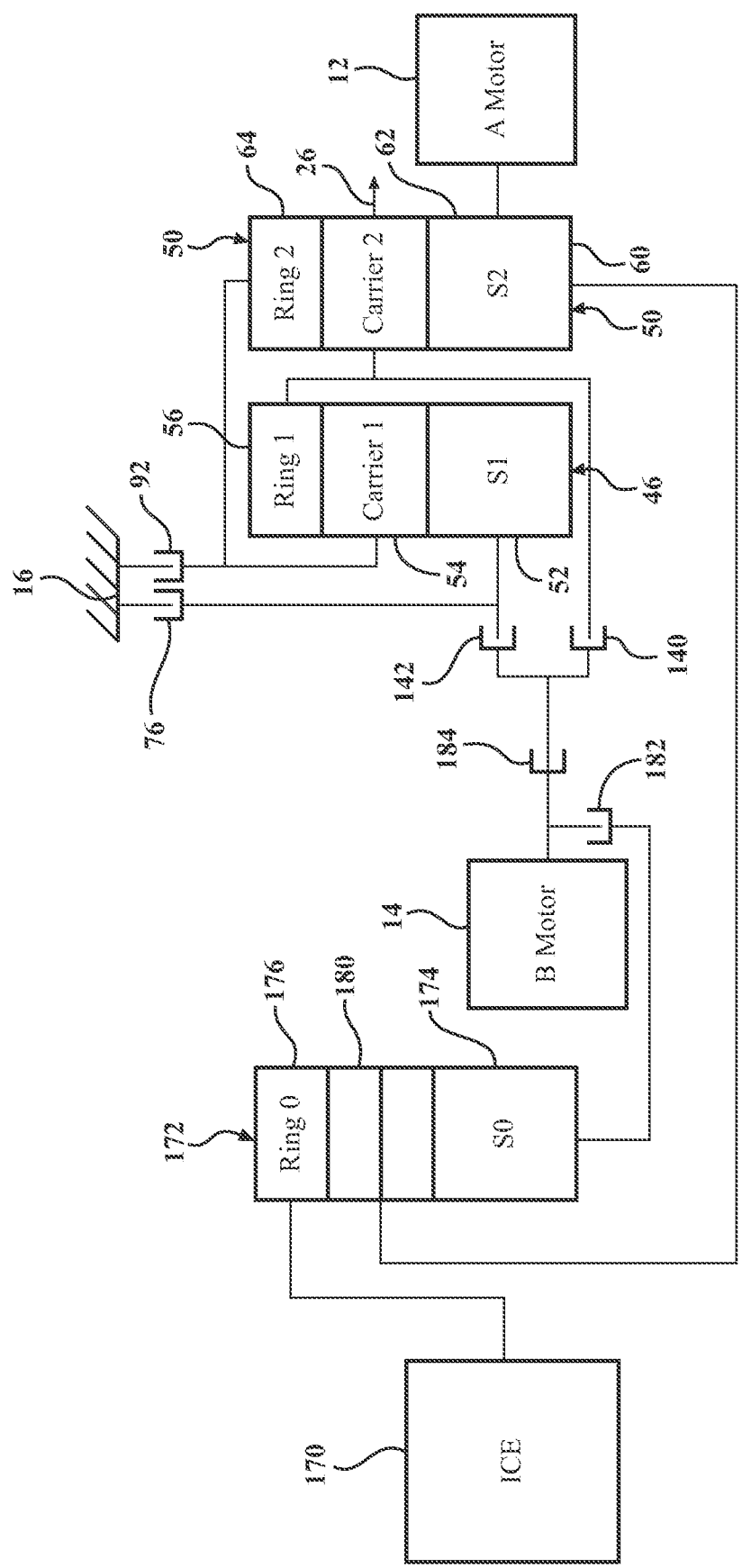
Figure 35:
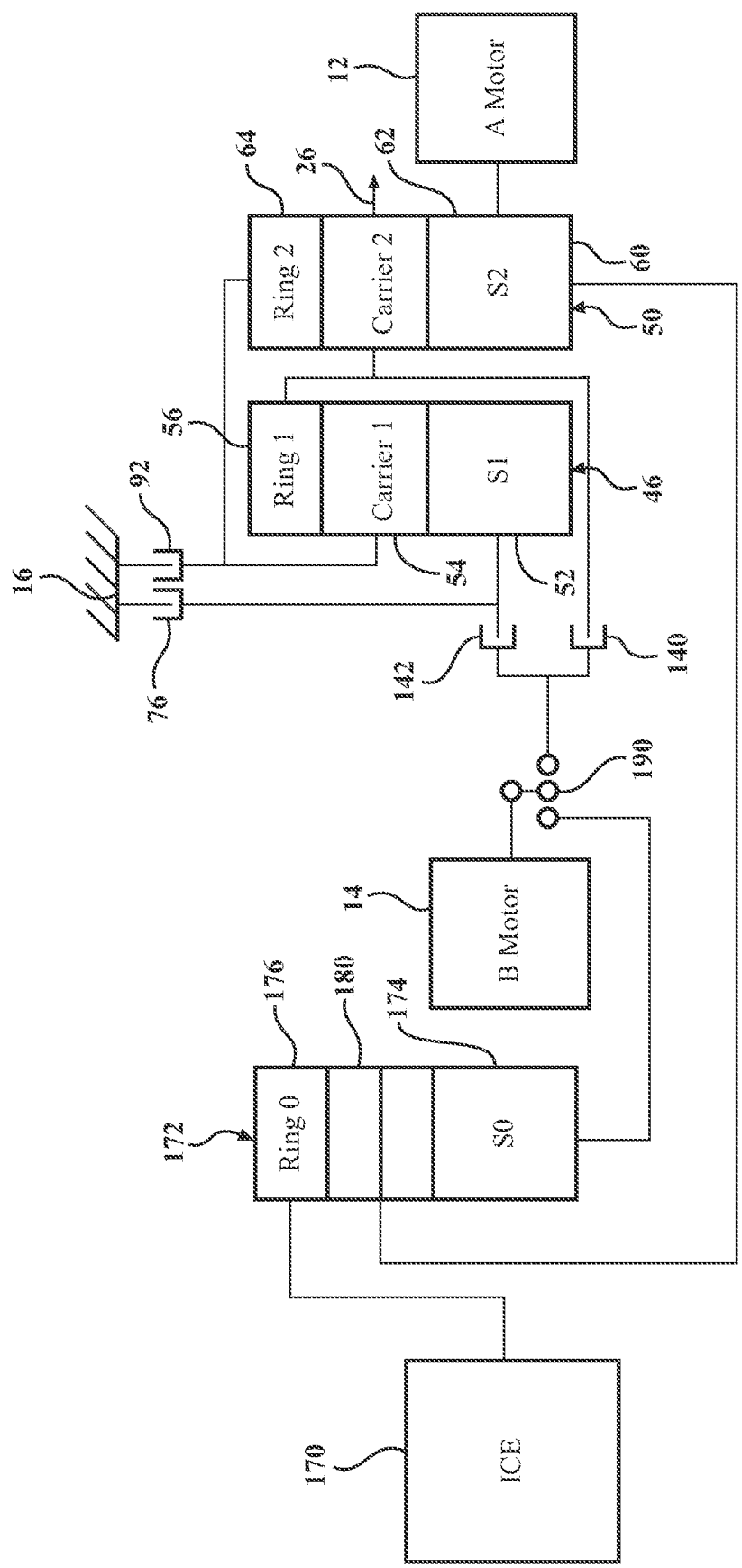
Figure 36:
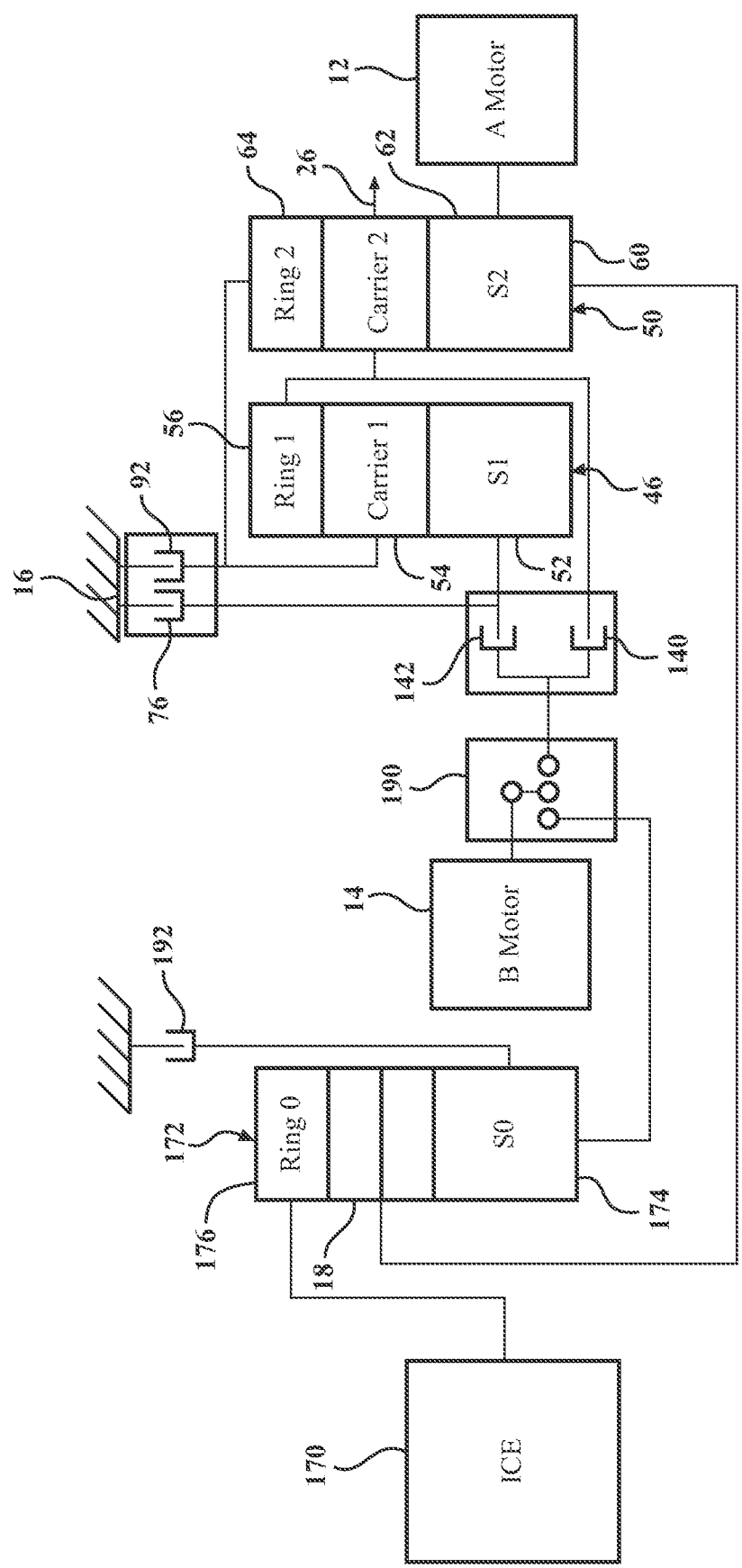

Referring to FIGS. 34A through 36, block diagrams of the embodiments shown in FIGS. 30, 32 and 33 are shown. These drawings represent how a transmission 10 would be laid out in design. In FIG. 34A, the block diagram represents the transmission 10 shown in the lever diagram of FIG. 30. In FIG. 34B, the block diagram represents the transmission 10 shown in the lever diagram of FIG. 33 but with two two-way clutches instead of a three-way clutch. In FIG. 35, the block diagram represents the transmission 10 shown in the lever diagram of FIG. 32. Finally, in FIG. 36, the block diagram represents the transmission 10 shown in the lever diagram of FIG. 33.

Figure 38:
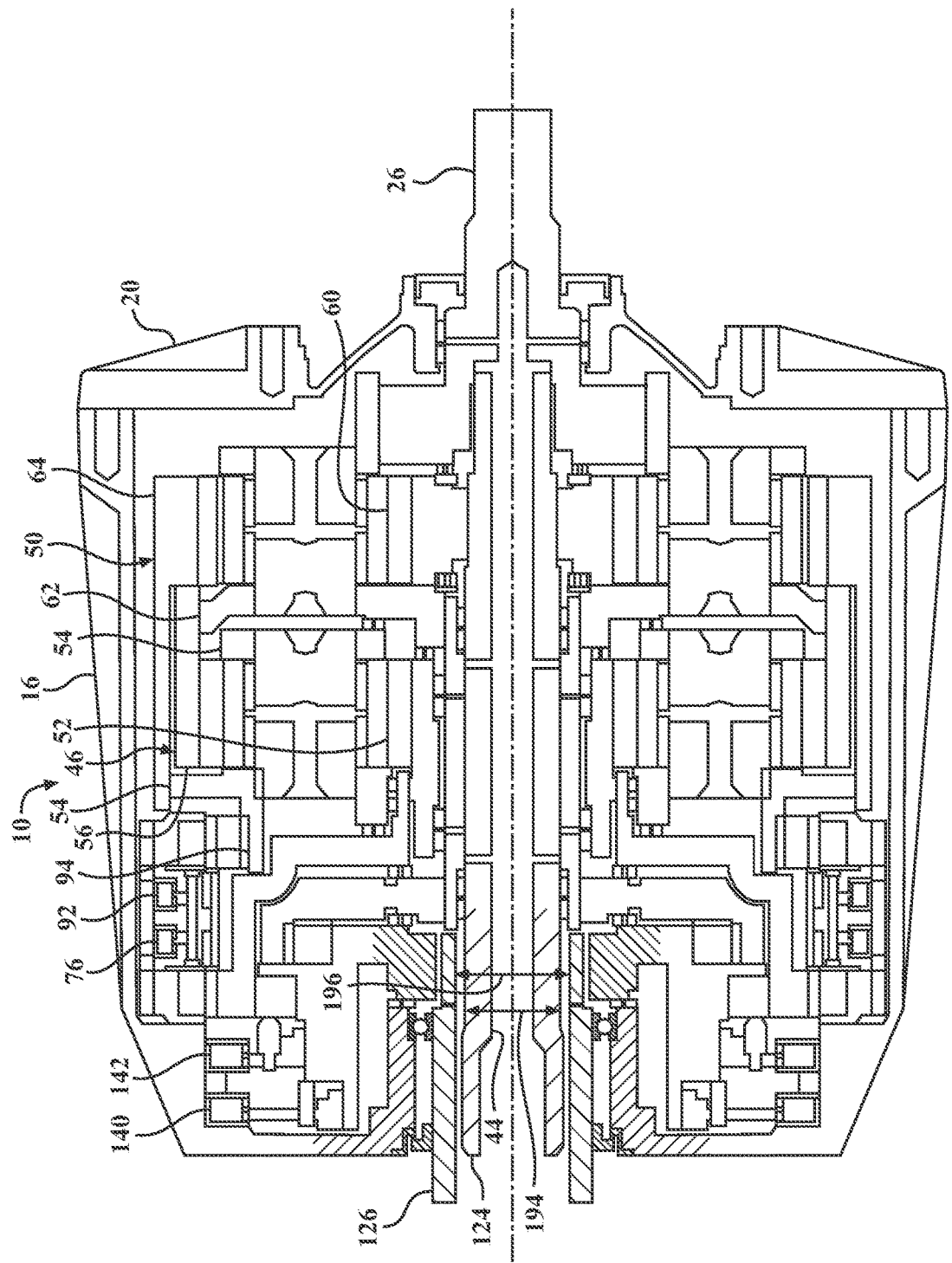
FIGS. 38 and 39 are cross-sectional side views of two embodiments of a transmission having two inputs with each having a different end cap for the housing.
Figure 39:
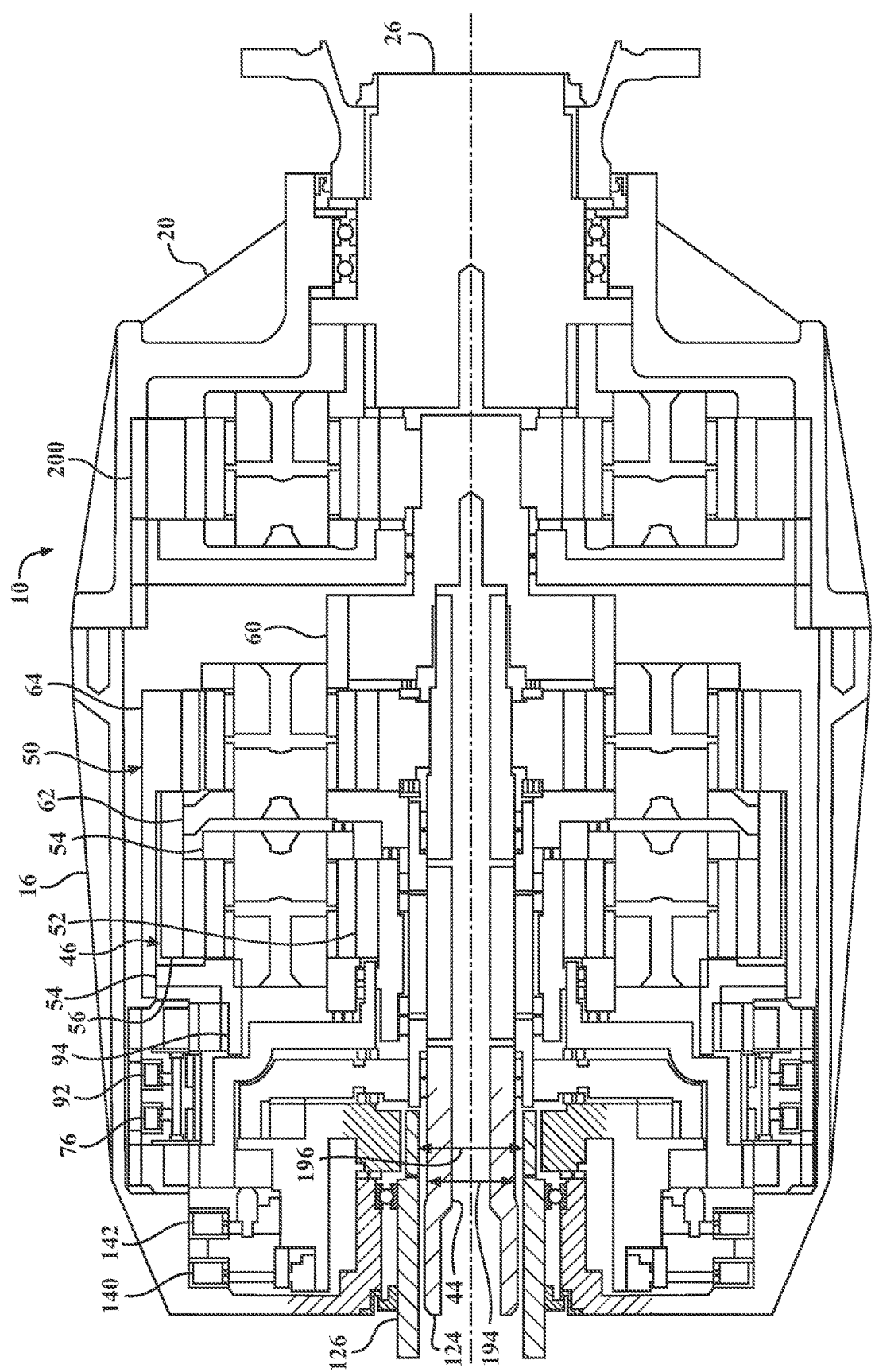

Referring to FIGS. 4, 38 and 39, different embodiments of the transmission 10 are shown in cross-section. The transmission 10 is modular in that it can be configured differently while maintaining almost all of the content inside the transmission housing 16 the same. The design of the transmission 10 allows it to be scaled up to handle larger ranges of torques based on the host vehicle into which the transmission 10 will be installed. In FIG. 4, the first input shaft 44 is the only input shaft. This embodiment only uses one input from the first motor 12 (A-Motor). In a sense, this is the most basic configuration of the transmission 10.

In the next iteration, shown in FIG. 38, the transmission has two input shafts 44, 126. The first input shaft 44 has an outer diameter 194 and the second input shaft 126 has inner diameter 196, with the outer diameter 194 of the first input shaft 44 being less than the inner diameter 196 of the second input shaft 126. The first input shaft 44 extends through the second input shaft 126. In the embodiment shown, the second input shaft 126 is a pocket plate. In order to accommodate the second input shaft 126, the second controllable clutch 142 (K24), and little else, is added.

Taking the modularity to the next level, the housing cap 20 can be one of several housing caps 20 to be used. Each housing cap 20 is configured to be mounted to the transmission housing 16 whereby the housing cap 20 provides for a different operational configuration. Referring to FIG. 39, the housing cap 20 is extends out further away from the transmission housing 16 more than the housing cap 20 of FIG. 38. This is because the housing cap 20 of FIG. 39 houses a gearset 200 to be used as a torque multiplier. Because the transmission 10 is modular, the additional torque multiplier 200 can be added to the transmission 10 and the transmission 10 can be interchangeable between a version that has a torque multiplying gearset 200 (FIG. 39) and a version that is supplied without a torque multiplying gearset 200 (FIG. 38).

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A transmission assembly comprising:
a transmission housing;
a first gearset including first, second and third rotating elements disposed within said transmission housing;
a second gearset including fourth, fifth and sixth rotating elements disposed within said transmission housing adjacent said first gearset;
an output shaft connected to said third rotating element of said first gearset and said fifth rotating element of said second gearset;
a first input shaft connected to said fourth rotating element of said second gearset;
a first controllable clutch connected to said first rotating element of said first gearset;
a second input shaft connected to said first controllable clutch such that said first controllable clutch selectively couples said second input shaft to said first rotating element of said first gearset;
a second controllable clutch selectively coupling said second input shaft with said output shaft through said third rotating element of said first gearset and said fifth rotating element of said second gearset;
a first controllable brake selectively coupling said first rotating element to said transmission housing; and
a second controllable brake selectively coupling said second rotating element of said first gearset and said sixth rotating element of said second gearset to said transmission housing, such that said first and second controllable clutches and said first and second controllable brakes control the torque of said output shaft as a function of forces driving said first and second input shafts.

2. A transmission assembly as set forth in claim 1 wherein two of said rotating elements of said first gearset are connected to two of said rotating elements of said second gearset to form a linkage defined by four nodes.

3. A transmission assembly as set forth in claim 2 wherein said first controllable brake is lockingly controlled to change state to maintain a desired transmission ratio for said transmission assembly.

4. A transmission assembly as set forth in claim 3 wherein said first controllable brake is independently controllable in two directions.

5. A transmission assembly as set forth in claim 1 wherein said first input shaft defines an outer diameter and said second input shaft defines an inner diameter greater than said outer diameter of said first input shaft.

6. A transmission assembly as set forth in claim 5 wherein said first input shaft extends through said second input shaft.

7. A transmission assembly as set forth in claim 1 wherein said first and second gearsets are coupled together forming a ring-carrier/ring-carrier gearset configuration that can be defined by a four-node linkage.

8. A transmission assembly as set forth in claim 7 wherein said ring-carrier/ring-carrier gearset configuration includes said second rotating element coupled to said sixth rotating element and said third rotating element coupled to said fifth rotating element.

9. A transmission assembly as set forth in claim 1 wherein said first controllable clutch couples said second input shaft to said output shaft.

10. A powertrain assembly comprising:
a transmission housing;
a first motor disposed in spaced relation with said transmission housing, said first motor having a first motor output shaft;
a second motor disposed adjacent said transmission housing, said second motor having a second motor output shaft coaxial with said first motor output shaft;
a first gearset including first, second and third rotating elements disposed within said transmission housing;
a second gearset including fourth, fifth and sixth rotating elements disposed within said transmission housing adjacent said first gearset;
an output shaft connected to said third rotating element of said first gearset and said fifth rotating element of said second gearset;
a first input shaft connected at one end to said first motor output shaft and at another end to said fourth rotating element of said second gearset;
a first controllable clutch connected to said first rotating element of said first gearset;
a second input shaft connected at one end to said second motor output shaft and at another end to said first controllable clutch such that said first controllable clutch selectively couples said second input shaft to said first rotating element of said first gearset;
a second controllable clutch selectively coupling said second input shaft with said output shaft through said third rotating element of said first gearset and said fifth rotating element of said second gearset;
a first controllable brake selectively coupling said first rotating element to said transmission housing; and
a second controllable brake selectively coupling said second rotating element of said first gearset and said sixth rotating element of said second gearset to said transmission housing, such that said first and second controllable clutches and said first and second controllable brakes control the torque of said output shaft as a function of forces driving said first and second input shafts.

11. A powertrain assembly as set forth in claim 10 wherein said second motor input shaft defines an inner diameter and an outer diameter.

12. A powertrain assembly as set forth in claim 11 wherein said first motor input shaft extends through said second motor input shaft.

13. A powertrain assembly as set forth in claim 12 wherein said first motor input shaft defines an outer diameter less than said inner diameter of said second motor input shaft.

14. A powertrain assembly as set forth in claim 12 wherein said second motor is connected to said transmission housing and said first motor such that said second motor is between said first motor and said transmission housing.

15. A powertrain assembly as set forth in claim 10 wherein said first motor and said second motor are fixedly secured to said transmission housing on either side of said transmission housing.

16. A transmission assembly comprising:
a transmission housing defining an open end;
a first gearset including first, second and third rotating elements disposed within said transmission housing;
a second gearset including fourth, fifth and sixth rotating elements disposed within said transmission housing adjacent said first gearset;
an output shaft connected to said third rotating element of said first gearset and said fifth rotating element of said second gearset, said output shaft extending through said open end;
a first input shaft connected to said fourth rotating element of said second gearset;

a first controllable clutch connected to said first rotating element of said first gearset;

a second input shaft connected to said first controllable clutch such that said first controllable clutch selectively couples said second input shaft to said first rotating element of said first gearset;

a second controllable clutch selectively coupling said second input shaft with said third rotating element of said first gearset and said fifth rotating element of said second gearset;

a first controllable brake selectively coupling said first rotating element to said transmission housing;

a second controllable brake selectively coupling said second rotating element of said first gearset and said sixth rotating element of said second gearset to said transmission housing, such that said first and second controllable clutches and said first and second controllable brakes control the torque of said output shaft as a function of forces driving said first and second input shafts; and a housing cap coaxial with said transmission housing covering said open end of said transmission housing, said housing cap having a cap opening through which said output shaft extends, wherein said housing cap is one of a plurality of different housing caps, whereby each of said plurality of different housing caps is configured to be mounted, in modular construction, to said transmission housing such that each of said plurality of different housing caps provides for different operational configurations.

17. A transmission assembly as set forth in claim 16 wherein two of said rotating elements of said first gearset are connected to two of said rotating elements of said second gearset to form a linkage defined by four nodes.

18. A transmission assembly as set forth in claim 17 wherein said first controllable brake is lockingly controlled to change state to maintain a desired transmission ratio for said transmission assembly.

19. A transmission assembly as set forth in claim 16 wherein said first controllable brake is independently controllable in two directions.

20. A transmission assembly as set forth in claim 16 wherein said first input shaft defines an outer diameter and said second input shaft defines an inner diameter greater than said outer diameter of said first input shaft.

21. A transmission assembly as set forth in claim 16 wherein said first and second gearsets are coupled together forming a ring-carrier/ring-carrier gearset configuration that can be defined by a four-node linkage.

22. A transmission assembly as set forth in claim 21 wherein said ring-carrier/ring-carrier gearset configuration includes said second rotating element coupled to said sixth rotating element and said third rotating element coupled to said fifth rotating element.

23. A transmission assembly as set forth in claim 16 wherein said first controllable clutch couples said second input shaft to said output shaft.

\* \* \* \* \*